United States Patent
Carman et al.

(10) Patent No.: US 6,272,632 B1
(45) Date of Patent: *Aug. 7, 2001

(54) SYSTEM AND METHOD FOR CONTROLLING ACCESS TO A USER SECRET USING A KEY RECOVERY FIELD

(75) Inventors: David W. Carman, Glenwood; David M. Balenson, Olney; Homayoon Tajalli, Ellicott City; Stephen T. Walker, Glenwood, all of MD (US)

(73) Assignee: Network Associates, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,677

(22) Filed: Feb. 12, 1998

Related U.S. Application Data

(63) Continuation-in-part of application No. 09/004,915, filed on Jan. 9, 1998, now abandoned, which is a continuation-in-part of application No. 08/781,626, filed on Jan. 10, 1997, now Pat. No. 5,745,573, which is a continuation of application No. 08/691,564, filed on Aug. 2, 1996, now abandoned, which is a division of application No. 08/390,959, filed on Feb. 21, 1995, now Pat. No. 5,557,765, which is a continuation-in-part of application No. 08/462,688, filed on Jun. 5, 1995, now Pat. No. 5,557,364.

(51) Int. Cl.[7] .................................................... H04L 9/00
(52) U.S. Cl. ........................ 713/168; 713/160; 713/170; 713/155; 713/200; 380/286; 380/277; 380/59
(58) Field of Search .................................. 713/200, 155, 713/160, 168, 170; 380/286, 277, 59

(56) References Cited

U.S. PATENT DOCUMENTS

| | | | |
|---|---|---|---|
| 4,200,770 | 4/1980 | Hellman et al. | 380/30 |
| 4,386,233 | 5/1983 | Smid et al. | 178/22.08 |
| 4,405,829 | 9/1983 | Rivest et al. | 380/30 |
| 4,590,470 | 5/1986 | Koenig | 380/25 |
| 4,607,137 | 8/1986 | Jansen et al. | 380/21 |
| 4,868,877 | 9/1989 | Fischer | 380/25 |
| 4,910,774 | 3/1990 | Barakat | 380/23 |

(List continued on next page.)

FOREIGN PATENT DOCUMENTS

| | | |
|---|---|---|
| 0493232 | 7/1992 | (EP) . |
| WO 92/09161 | 11/1991 | (WO) . |
| WO 93/21708 | 10/1993 | (WO) . |

OTHER PUBLICATIONS

Computer Systems Laboratory, National Institute of Standards and Technology, Gaithersburg, MD, "Escrowed Encrytion Standard (EES)", *Federal Information Processing Standards Publication*, FIPS PUB 185, Feb. 9, 1994.

Dorothy Denning, "The Clipper Chip: A Technical Summary", Revised Apr. 21, 1993.

(List continued on next page.)

*Primary Examiner*—Tod Swann
*Assistant Examiner*—Paul E. Callahan
(74) *Attorney, Agent, or Firm*—Cooley Godward, LLP

(57) ABSTRACT

A system and method for data recovery is described. In one embodiment, an encrypting system encrypts a message or file using a secret key (KS) and attaches a key recovery field (KRF), including an access rule index (ARI) and KS, to the encrypted message or file. To access the encrypted message or file, a decrypting system must satisfactorily respond to a challenge issued by a key recovery center. The challenge is based on one or more access rules that are identified by the ARI included within the KRF.

30 Claims, 11 Drawing Sheets

U.S. PATENT DOCUMENTS

| | | | |
|---|---|---|---|
| 4,926,480 | 5/1990 | Chaum | 380/30 |
| 4,947,430 | 8/1990 | Chaum | 380/25 |
| 4,996,711 | 2/1991 | Chaum | 380/30 |
| 5,005,200 | 4/1991 | Fischer | 380/30 |
| 5,144,665 | 9/1992 | Takaragi et al. | 380/30 |
| 5,191,611 | 3/1993 | Lang | 380/25 |
| 5,200,999 | 4/1993 | Matyas et al. | 380/30 |
| 5,210,795 | 5/1993 | Lipner et al. | 380/30 |
| 5,214,702 | 5/1993 | Fischer | 380/30 |
| 5,224,163 | 6/1993 | Gasser et al. | 380/25 |
| 5,226,080 | 7/1993 | Cole et al. | 380/25 |
| 5,263,157 | 11/1993 | Janis | 380/4 |
| 5,265,163 | 11/1993 | Golding et al. | 380/25 |
| 5,265,164 | 11/1993 | Matyas et al. | 380/30 |
| 5,267,313 | 11/1993 | Hirata | 380/21 |
| 5,276,736 | 1/1994 | Chaum | 380/25 |
| 5,276,737 | 1/1994 | Micali | 380/30 |
| 5,276,901 | 1/1994 | Howell et al. | 395/800 |
| 5,280,527 | 1/1994 | Gullman et al. | 380/23 |
| 5,299,263 | 3/1994 | Beller et al. | 380/30 |
| 5,313,521 | 5/1994 | Torii et al. | 380/21 |
| 5,313,637 | 5/1994 | Rose | 380/4 |
| 5,315,658 | 5/1994 | Micali | 380/30 |
| 5,341,426 | 8/1994 | Barney et al. | 380/30 |
| 5,347,578 | 9/1994 | Duxbury | 380/4 |
| 5,351,293 | 9/1994 | Michener et al. | 380/21 |
| 5,371,794 | 12/1994 | Diffie et al. | 380/21 |
| 5,373,559 | 12/1994 | Kaufman et al. | 380/30 |
| 5,386,470 | 1/1995 | Carter et al. | 380/23 |
| 5,406,628 | 4/1995 | Beller et al. | 380/21 |
| 5,436,972 | 7/1995 | Fischer et al. | 380/30 |
| 5,481,613 * | 1/1996 | Ford et al. | 380/30 |
| 5,557,346 | 9/1996 | Lipner et al. | 380/21 |
| 5,557,765 | 9/1996 | Lipner et al. | 380/21 |
| 5,564,106 | 10/1996 | Fuhl et al. | 380/21 |
| 5,631,961 * | 5/1997 | Mills et al. | 380/21 |
| 5,640,454 * | 6/1997 | Lipner et al. | 380/21 |
| 5,745,573 | 4/1998 | Lipner et al. | 380/21 |
| 5,857,022 * | 1/1999 | Sudia | 380/23 |
| 5,901,227 * | 5/1999 | Perlman | 380/21 |
| 5,937,066 * | 8/1999 | Gennaro et al. | 380/21 |
| 5,956,403 * | 9/1999 | Lipner et al. | 380/21 |
| 5,991,406 | 11/1999 | Lipner et al. | 380/21 |

OTHER PUBLICATIONS

Maher, David P., *CryptoBackup and key escrow*, Communication of the ACM, vol. 39, No. 3, Mar. 1996.

L. Harn and H. Y. Lin, "Integration of user authentication and access control", *IEEE Proceedings–E*, vol. 139, No. 2, pp. 139–143, Mar. 1992.

Brickell et al., "Skipjack Review: Interim Report: The Skipjack Algorithm", *Georgetown University, Office of Public Affairs*, pp. 1–6 Jul. 28, 1993.

Maher, David P., "Trust in the new Information Age", *AT&T Technical Journal*, Sep./Oct. 1994, vol. 73, No. 5, Security Technologies, pp. 9–16.

"Fair Cryptosystems", Micali, S., Aug. 11, 1993.

"Draft Proposed Escrowed Encryption Standard", Branstad et al., viewgraphs presented at Computer Security and Privacy Meeting, Mar. 1994.

"Protocol Failure in the Escrowed Encryption Standard", Blaze, M., presented on Internet, Jun. 3, 1994.,.

Private Escrow Key Management Key Escrow Encryption Workshop, Scheidt et al., paper distributed Jun. 10, 1994.

"A Solution for the International Community", TECSEC, Key Escrow Encryption Workshop, viewgraphs distributed Jun. 10, 1994.

"An Advanced Key Management System", TECSEC, Key Escrow Encryption Workshop, paper distributed Jun. 10, 1994.

"Key Escrowing Today", Denning et al., *IEEE Communications*, Sep. 1994.

"A Taxonomy for Key Escrow Encryption Systems", Denning et al., draft distributed Sept. 24, 1994.

"Key Escrow Encryption: Does it Protect or Compromise User Interest?", Denning, D., Jan. 3, 1995.

"Observations About Key Escrow Alternatives", Denning, D., Jan. 2, 1995.

Denning, Dorothy, "International Key Escrow Encryption: Proposed Objectives", *Georgetown University* draft of May 23, 1994.

Eldridge, Alan, Lotus Notes, "Key Escrow for Lotus Notes", comments submitted in Key Escrow Alternatives Workshop, Jun. 10, 1994.

Fischer, Addison, Fischer International, "Software Key Escrow –Corporate Implementation", comments submitted in Key Escrow Alternatives Workshop, Jun. 10, 1994.

Novell, "Encryption Alternatives", comments submitted in Key Escrow Alternatives Workshop, Jun. 10, 1994.

Computer Associates International, Inc., "Commerical Cryptography Perspectives", comments submitted in key Escrow Alternatives Workshop, Jun. 10, 1994.

Puhl, Larry, Motorola, comments submitted in Key Escrow Alternatives Workshop, Jun. 8, 1994.

Ferguson, Bill, Semaphore, comments submitted in Key Escrow Alternatives Workshop, Jun. 8, 1994.

COMPAQ Computer Corporation, "Proposed NIST Draft", comments submitted in Key Escrow Alternatives Workshop, Jun. 10, 1994.

Housley, Russell, SPYRUS, letter to Lynn McNulty, Aug. 3, 1994.

Desmedt, Yvo et al., "A Scientific Statement on the Clipper Chip Technology and Alternatives", *University of Wisconsin, Milwaukee*.

Droge, John C., "International Key Escrow", presented to NIPLI, Sep. 22, 1994.

Ford et al., "A Key Distribution Method for Object–Based Protection", presented at the Second ACM Conference on Computer and Communications Security, Nov. 2–4, 1994, Fairfax, Virginia, pp. 193–197.

Zimmerman, P., "Phil's Pretty Good Software Presents PGP: Pretty Good Privacy Public Key Encryption for the Masses", *PGP User's Guide vol. I: Essential Topics*, Dec. 3, 1992, pp. 1–40.

Zimmerman, P., "Phil's Pretty Good Software Presents PGP: Pretty Good Privacy Public Key Encryption for the Masses", *PGP User's Guide vol. II: Special Topics*, Dec. 3, 1992, pp. 1–53.

*Appendix A. Internal Data Structures Used by PGP 2.1*, Dec. 3, 1992, pp. 1–18.

* cited by examiner

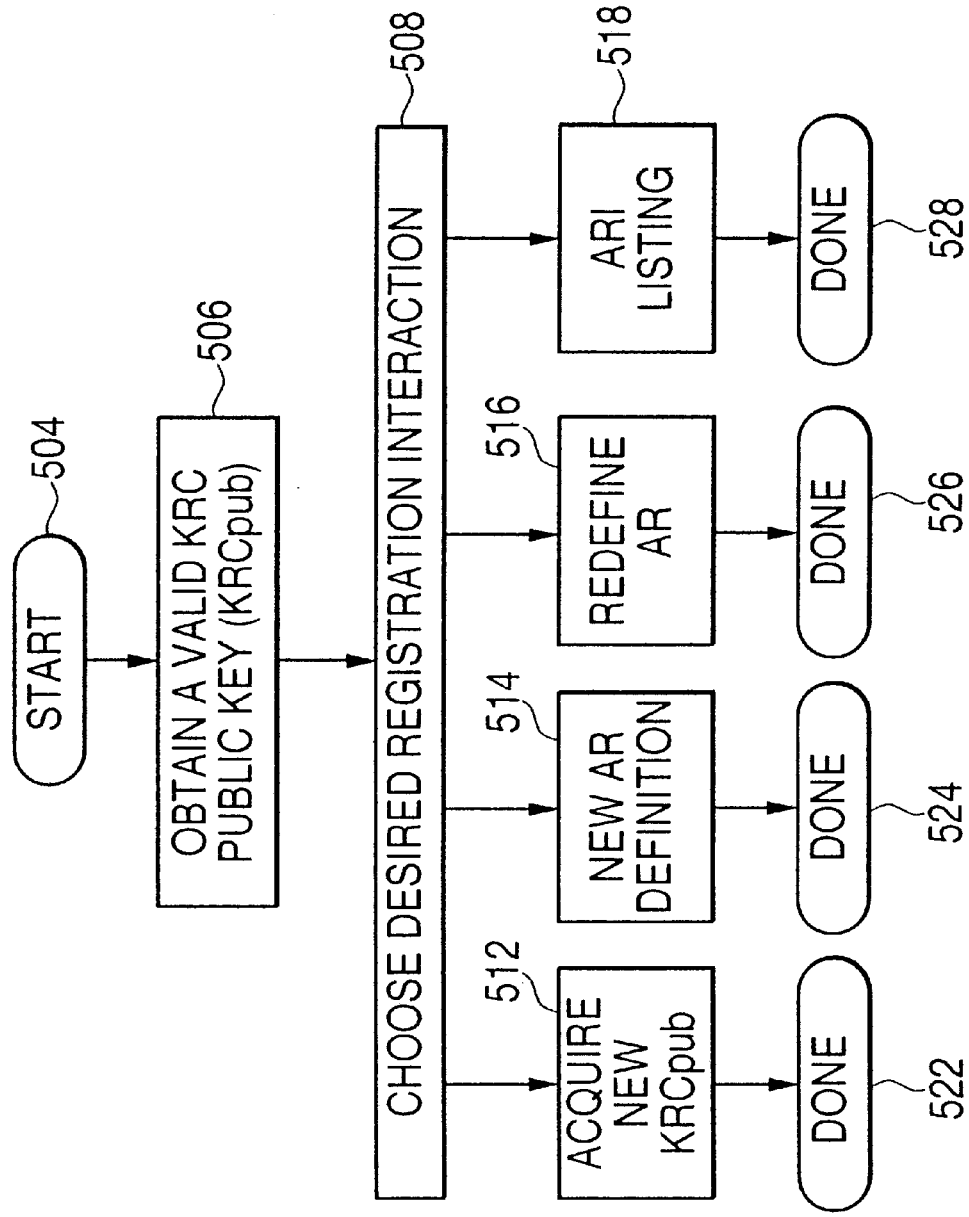

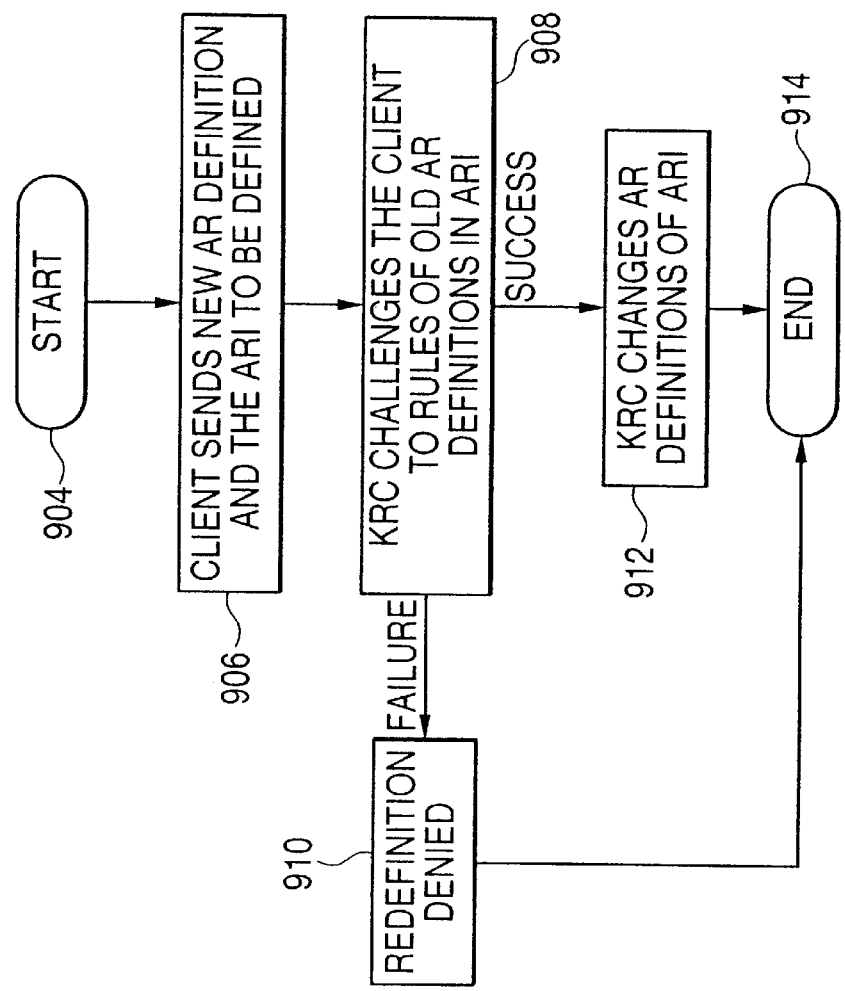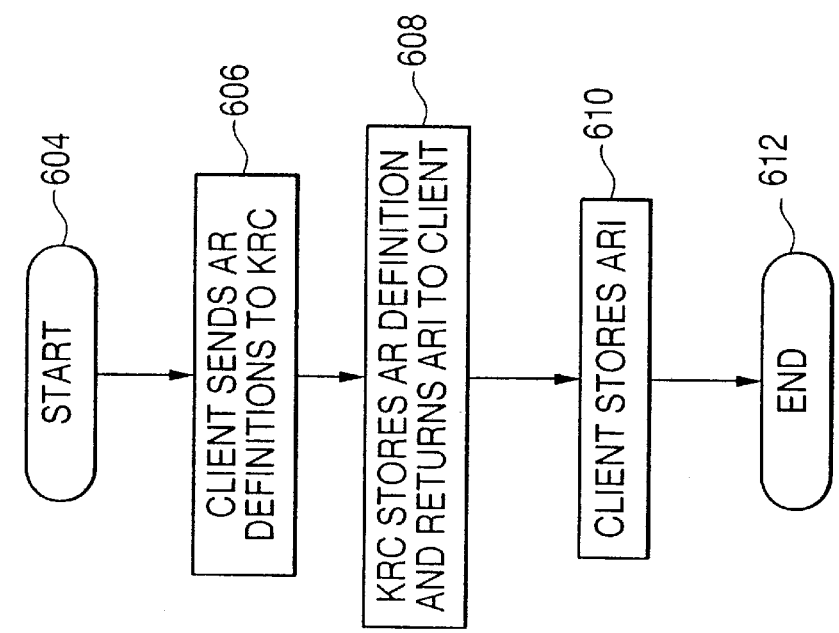

SYSTEM AND METHOD FOR CONTROLLING ACCESS TO A USER SECRET USING A KEY RECOVERY FIELD

This is a continuation-in-part of the Application entitled "System and Method for Controlling Access to a User Secret", Ser. No. 09/004,915 , filed Jan. 9, 1998 (status: now abandoned), which is a continuation-in-part of Application entitled "System And Method For Controlling Access to a User Secret", application Ser. No. 08/781,626, filed Jan. 10, 1997 (status: now U.S. Pat. No. 5,745,573), which is a continuation of application Ser. No. 08/691,564, filed Aug. 2, 1996 (status: abandoned), which is a divisional of Ser. No. 08/390,959, filed Feb. 21, 1995, now U.S. Pat. No. 5,557,765, issued Sep. 17, 1996, which is a continuation-in-part of Ser. No. 08/462,688, now filed Jun. 5, 1995, now U.S. Pat. No. 5,557,364, issued Sep. 17, 1996. U.S. Pat. No. 5,557,765, U.S. Pat. No. 5,557,364, and the Application entitled "System and Method for Controlling Access to a User Secret", Ser. No. 09/004,915, filed Jan. 9, 1998 are incorporated herein by reference in their entireties .

BACKGROUND OF THE INVENTION

Field of the Invention

The present invention relates generally to data encryption, and more particularly to data recovery.

Related Art

Data encryption is critical to ensuring the confidentiality of sensitive information. Various symmetric and asymmetric encryption methodologies can be used alone or in combination to implement the security functions.

Historically, encryption systems that have been used to protect sensitive information have been implemented as separate hardware devices, usually outboard "boxes" between a computer or communications system and a communications circuit. Such devices are designed with a high level of checking for operational integrity in the face of failures or malicious attack, and with especially careful measures for the protection of cryptographic functions and keys.

Software encryption systems have historically been viewed with suspicion because of their limited ability to protect their algorithms and keys. Over and above these issues is the fact that an encryption algorithm implemented in software is subject to a variety of attacks. The computer's operating system or a user can modify the code that implements the encryption algorithm to render it ineffective, steal secret cryptographic keys from memory, or, worst of all, cause the product to leak its secret cryptographic keys each time it sends or receives an encrypted message.

The principal disadvantage of using encryption hardware, and therefore the primary advantage of integrated software implementations, is cost. When encryption is implemented in hardware, whether a chip, a board or peripheral (such as a PCMCIA card) or a box, end users have to pay the price. Vendors must purchase chips and design them into devices whose costs go up because of the additional "real estate" required for the chip. End users must purchase more expensive devices with integrated encryption hardware, or must buy PCMCIA cards or similar devices and then pay the price for adding a device interface to their computing systems or dedicating an existing interface to encryption rather than another function such as that performed by a modem or disk.

A second advantage of software implementations is simplicity of operation. Software solutions can be readily integrated into a wide variety of applications. Generally, the mass market software industry, which attempts to sell products in quantities of hundreds of thousands or millions, seeks to implement everything it can in software so as to reduce dependencies on hardware variations and configurations and to provide users with a maximum of useful product for minimum cost.

SUMMARY OF THE INVENTION

The present invention is generally directed to a system and method for controlling access to a user secret. A user secret generally represents an arbitrary piece of confidential information to which a user wishes to control access. In one embodiment, the user secret represents a secret key (KS) that is used to encrypt a piece of data, D. In a communication application, the data, D, represents a message, M, to be transmitted to a receiving entity. In a storage application, the data, D, represents a file, F, that is encrypted and subsequently stored.

More specifically, according to an embodiment of the present invention, an encrypting system encrypts D using KS to produce encrypted data or cipher text C. The encrypting system then generates a key recovery field (KRF). The KRF includes an access rule index (ARI) and the KS. The KS is protected by a key recovery center (KRC) public key (KRCpub). KRCpub is acquired in a registration phase. During this registration phase, an access rule defining system defines an access rule (AR) that controls subsequent access to the secret KS. After the KRC receives the AR from the AR defining system, the KRC returns an ARI. The ARI can be included in one or more KRFs attached to subsequent encrypted files.

To decrypt encrypted data C that is encrypted with KS, a decrypting system must have access to the secret KS. If the decrypting system does not have knowledge of the secret KS, then emergency access is achieved via the KRF. In one recovery scenario, the emergency decrypting system extracts the KRF attached to the encrypted message and sends the KRF to the KRC. The KRC presents a challenge to the emergency decrypting system based on the AR that is referenced by the ARI included within the KRF. If the emergency decrypting system successfully meets the challenge, the KRC sends the secret KS to the emergency decrypting system.

In another recovery scenario, the emergency decrypting system sends both the encrypted data C and the KRF to the KRC. In a similar manner, the KRC presents a challenge to the emergency decrypting system based on the AR that is referenced by the ARI included within the KRF. If the emergency decrypting system successfully meets the challenge, the KRC uses the KS to decrypt the encrypted data C and sends the decrypted data D to the emergency decrypting system.

The KRF includes an unencrypted header section and an encrypted payload section. In one embodiment, the payload section includes a concatenation of an ARI (selected by the encrypting system) with a secret KS. The payload section is then encrypted using a KRCpub. The unencrypted header section includes a KRC identifier and a key identifier (KI). The KI uniquely identifies the KRCpub used to encrypt the payload section.

In a second embodiment, the unencrypted header section includes the KRC identifier, KI and the ARI. As the ARI does not represent authentication information it can be included within the KRF as clear text. To prevent the ARI (and/or other header information) from being exchanged, altered, or corrupted, the header section also includes an ARI binding digest. The ARI binding digest protects the integrity of the ARI and other header information in the unencrypted header section and securely binds it with the encrypted payload section that includes the KS.

The ARI binding digest does not represent authentication information. Consequently, the ARI binding digest can be, and preferably is, included within the KRF as clear text.

In alternative scenarios, access to a user secret can be achieved through one or more KRFs that are generated using a plurality of KRCpubs. Here, each KRCpub can be associated with a separate KRC. In these scenarios, multiple KRCs individually control, in whole or in part, the recovery of the US. Three multiple KRC scenarios include OR-Access, AND-Access, and Quorum-Access.

Generally, the user secret within a KRF is not limited to an encryption key but rather can include any arbitrary piece of confidential information. In all cases, the KRC limits access to emergency decrypting systems that can meet the challenge that is defined by the AR referenced by the ARI in the KRF containing the US.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein:

FIGS. 5–7 and 9 are flow charts depicting access rule definition.

DETAILED DESCRIPTION OF THE PREFERRED EMBODIMENTS

The present invention focuses on the recovery of a user secret. A user secret generally represents an arbitrary piece of confidential information to which a user wishes to control access. Recovery of the user secret is enabled through the creation of one or more key recovery fields. Access to the user secret encrypted within the one or more key recovery fields can be obtained through one or more access rules defined by an access rule defining system.

Preferably, in the present invention, encryption and decryption operations are performed using any well known, unclassified, and publicly available algorithms such as DES and IDEA or with any well known, proprietary but unclassified algorithms such as RSADSI's RC2 and RC4. The specific details of the encryption and decryption algorithm are not material to the present invention.

The following symbols are used herein.

$[a]b$ indicates that "a" is encrypted using key "b".

$a\|b$ indicates that "a" is concatenated with "b".

o XOR p indicates that "o" is bitwise exclusive-OR'ed with "p".

As used herein, values having labels with a suffix "priv" are considered to be private or secret. Values having labels with a suffix "pub" are considered to be public.

Concerning the symbol represented by $Z=[X]Y$ (X encrypted by public key Y), one can equivalently compute $Z=([X]K_1, [K_1]Y)$ (where $K_1$ is a conventional, randomly chosen, symmetric encryption key) and achieve the same functional result. This hybrid symmetric and asymmetric encryption may be desirable if X is larger than the quantity one can encrypt directly under Y in one pass. Similarly, one might also compute $Z=([X]K_2,[K_2]K_1,[K_1]Y)$.

1. Overview of the Invention

Figure 1:
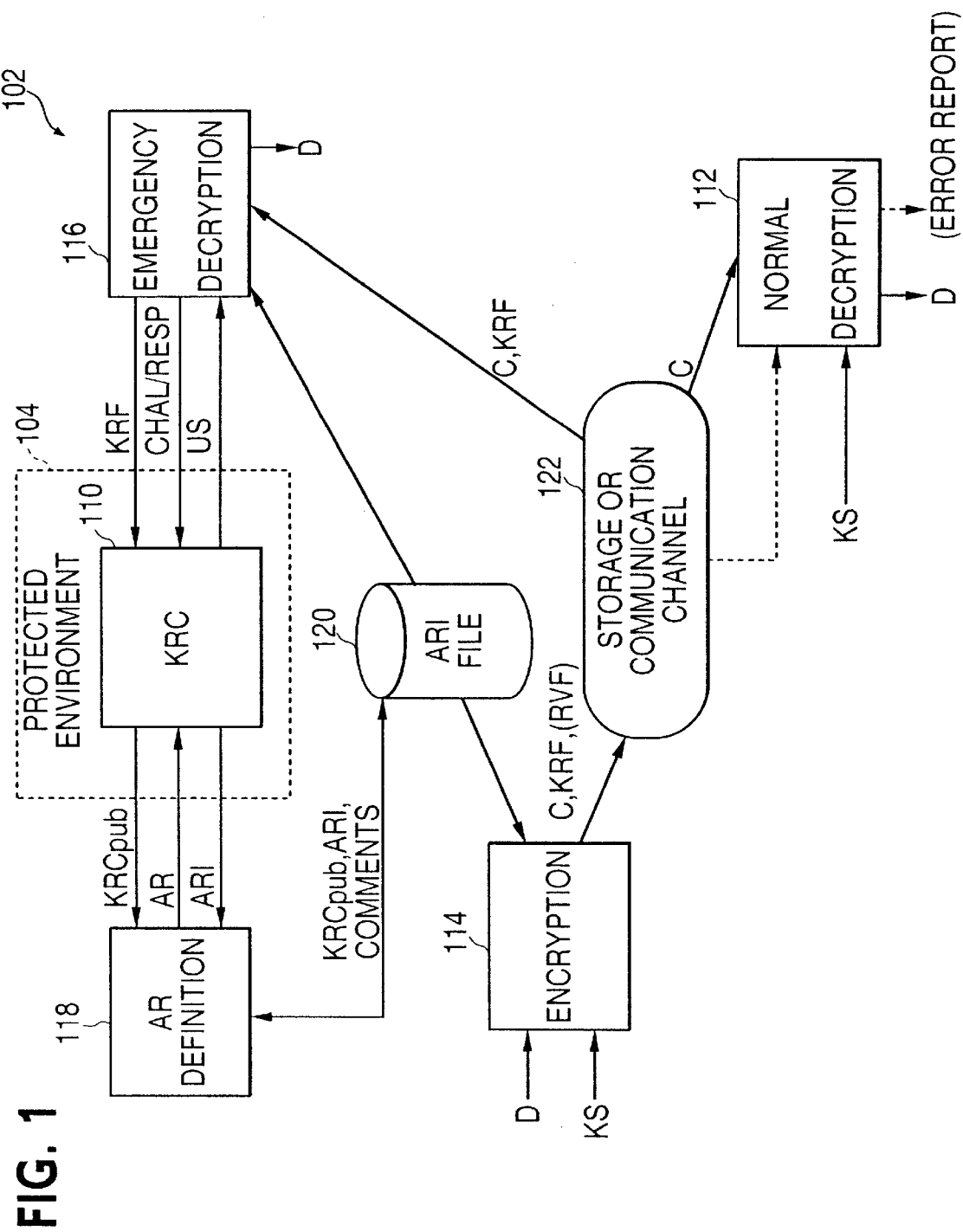
FIG. 1 illustrates a key recovery cryptographic system according to an embodiment of the present invention.

FIG. 1 illustrates a block diagram of an example environment 102, which enables the control of access to a user secret (US). A US generally represents an arbitrary piece of confidential information to which a user wishes to control access. In one embodiment, the US represents a secret key (KS) that is used to encrypt a piece of data, D. In a communication application, the data D represents a message to be transmitted to a receiving entity. In a storage application, the data D represents a file, F, that is encrypted and subsequently stored.

As noted, KS represents a specific type of US to which a user may wish to control access. The use of KS in the description below is not meant to be limiting. Rather, KS is used in place of the generic term US to describe a specific application environment to which the present invention can be applied. In the same manner, the terms key recovery center and key recovery field are not meant to be limiting. The functions that are performed by the key recovery center and the key recovery field can be applied to any generic US recovery application. The terms are used to aid in the description of a specific application environment.

Returning to FIG. 1, the example environment 102 includes a key recovery center (KRC) 110 situated in a protected environment 104. In one embodiment, the protected environment 104 includes a plurality of redundant KRCs 110 that enable recovery upon the failure of one or more KRCs 110. The protected environment 104 is established and maintained by any entity wishing to provide recovery services (as described herein). For example, the protected environment 104 can be established and maintained by an individual, a public organization (such as a state division of motor vehicles) or a private organization (such as a corporation), or a plurality and/or combination of public/private entities. Preferably, KRC 110 represents software executing on a suitably equipped computer system.

More generally, protected environment 104 is defined as a physically and procedurally secured area whose protection is adequate to the value of all information that will be protected by any encryption program. The KRC 110 includes various cryptographic-related data. Such data stored in the KRC 110 cannot be accessed by persons or entities outside the protected environment 104.

Functional elements 112 (normal decryption), 114 (data encryption), 116 (emergency decryption) and 118 (access rule definition) represent a processing system in four different operational modes. In the following description, the four functional elements will be referred to as the normal decrypting system, the encrypting system, the emergency decrypting system, and the access rule defining system, respectively. It should be understood that these systems do not necessarily represent the same processing system, although they could be on the same processing system, or they could be distributed in any combination among one or more processing systems. Also, it should be understood that the KRC 110 could reside on the same processing system as one or more of these systems, or could reside on a processing system that is distinct from the processing system(s) on which these systems respectively reside.

The operation of the example environment 102 is described below in the context of key recovery. In this example, a secret key (KS) is used to encrypt a piece of data, D, to produce encrypted data, C=[D]KS. In a communication application, the data represents a message, M, to be transmitted to a receiving entity. In a storage application, the data represents a file, F, that is encrypted and subsequently stored. Access to the data D is controlled by controlling access to KS. As noted, this example is not intended to limit the application of the present invention.

For example, in alternative embodiments the confidential information within the KRF need not be a secret key (i.e., encrypting key). The datum inside a KRF can be any generic US which the encrypting system 114 wishes to encrypt and store. The enclosure of such a datum inside a KRF is functionally equivalent to the encryption of that datum with a KS generated at random. The randomly generated KS is included within the KRF attached to the encrypted data and forces the owner to access the encrypted data through an emergency decrypting system 116.

The key recovery process begins with the access rule defining system 118 obtaining a KRC public key (KRCpub) from a KRC 110. The access rule defining system 118 then creates an access rule (AR) definition and registers that AR definition with KRC 110. KRC 110 sends an access rule index (ARI) corresponding to the registered AR back to the AR defining system 118. The AR defining system 118 then stores any new KRCpub, the new ARI and an optional comment in the access rule index (ARI) file 120. In one example, the attached comment describes the individual(s) that can satisfy the registered AR referenced by a particular ARI.

In the recovery application, the encrypting system 114 represents any system wishing to encrypt data, D, and store or transmit such encrypted data, C. As noted above, the data, D, to be encrypted can represent a message, M, in a communication application or a file, F, in a storage application. In one embodiment, the encrypting system 114 can represent a commercial software program (such as a word processor program, a spreadsheet program, a database program, a communication program, an operating system, a financial program, etc.) or a portion thereof running on a computer.

The encrypting system 114 creates a KRF using an ARI and the KS. The KS is protected by the KRCpub. The ARI and KRCpub values are retrieved from ARI file 120. The KRF is attached to the encrypted data C and is either stored or transmitted by the encrypting system 114. As described in greater detail below, a first embodiment includes the ARI as part of the payload that is encrypted with KRCpub, and a second embodiment includes the ARI as cleartext. These two embodiments can be illustrated using the abbreviated representations [ARI∥KS]KRCpub and ARI∥[KS]KRCpub, respectively. Note that, for ease of presentation, these abbreviated representations do not include all of the fields shown in FIGS. 10 and 15 (which are described below).

If verification of the KRF is desired, the encrypting system 114 may also generate a recovery verification field (RVF). The RVF generally includes one or more pieces (but not necessarily all pieces) of information that are needed to verify the contents or integrity of the KRF. One method of verification is effected through reconstruction of the KRF.

To support reconstruction, one embodiment of the (optional) RVF consists of the ARI and a pseudorandom padding value, which were included within the encrypted payload of the KRF. These values are optionally encrypted with an encryption key (e.g., KS). In another embodiment where the KRF is based on a hybrid of symmetric and asymmetric encryption (e.g., [KS]$KS_1$∥[$KS_1$]RCpub), the RVF would also include the symmetric key $KS_1$.

The RVF can be either stored or transmitted with the KRF. The structure of the RVF is implementation dependent. The RVF is functionally valuable based on the information it contains. The RVF is not limited functionally by either the time of its origination or the processing system that generates it. For example, the verification process may utilize pieces of information that are not originated by the encrypting system 114.

The encrypted data C and the KRP can be retrieved or received by either the normal decrypting system 112 or the emergency decrypting system 116. Typically, the normal decrypting system 112 is the same processing system as the encrypting system 114. In this scenario, the normal decrypting system 112 may have knowledge of the same KS without requiring any interaction with the KRC 110.

In contrast, an emergency access scenario occurs when an emergency decrypting system 116 does not have the KS required to decrypt the encrypted data, C. For example, this situation can occur in a corporate environment when a manager needs access to data encrypted by an employee, but the employee is not present and the manager does not know the employee's KS. It may also happen when the encrypting system 114 forgets KS or the normal means for generating it or gaining access to it.

To access the encrypted data, the emergency decrypting system 116 extracts the KRF from the storage channel 122 and sends it to the KRC 110. It should be noted that the emergency decrypting system 116 can also receive the KRF on the communication channel 122. The KRC 110 responds with a challenge defined by a previously registered AR. The AR was registered with the KRC 110 by the AR defining system 118 at the registration phase and selected by the encrypting system 114 during encryption through the inclusion of the associated ARI in the KRF. If the emergency decrypting system 116 successfully meets the challenge presented by the KRC 110, the KRC 110 releases the KS contained within the associated KRF to the emergency decrypting system 116. In this scenario, the emergency decrypting system 116 can generally be described as a party privileged to the information originated by the encrypting system 114 (e.g., management).

In other recovery scenarios, the emergency decrypting system 116 extracts both the KRF and the encrypted data C from the storage medium 122 and sends both items to the KRC 110. Again, it should be noted that the KRF and the encrypted data C can be received on the transmission channel 122. In a similar fashion, the KRC 110 responds with a challenge defined by a previously registered AR. If the emergency decrypting system 116 successfully meets the challenge presented by the KRC 110, the KRC 110 uses the KS encrypted within the associated KRF to decrypt the encrypted data C. The KRC 110 then returns the decrypted message, M, or file, F, to the emergency decrypting system 116.

As noted, the KS within the KRF is one example of a US. In other words, the intended use of the US does not limit the scope of the present invention.

1.1 Processing System Description

Preferably, the KRC 110, the AR defining system 118, the encrypting system 114, the normal file decrypting system 112, and the emergency decrypting system 116 each represent a data processing device operating according to instructions or commands from a controller. In some embodiments, the data processing device includes a processor, in which case the processor operates according to instructions or commands from the controller. In one embodiment, the controller represents a hardware state machine. In an alternate embodiment, the controller represents a computer program in an electronic/magnetic form (or other form, such as but not limited to an optical form) that is useable by a computer. Preferably, the computer program is distributed as a computer program product (such as a floppy disk or other computer storage device/component having control logic recorded thereon), or via a communications network.

Figure 2:
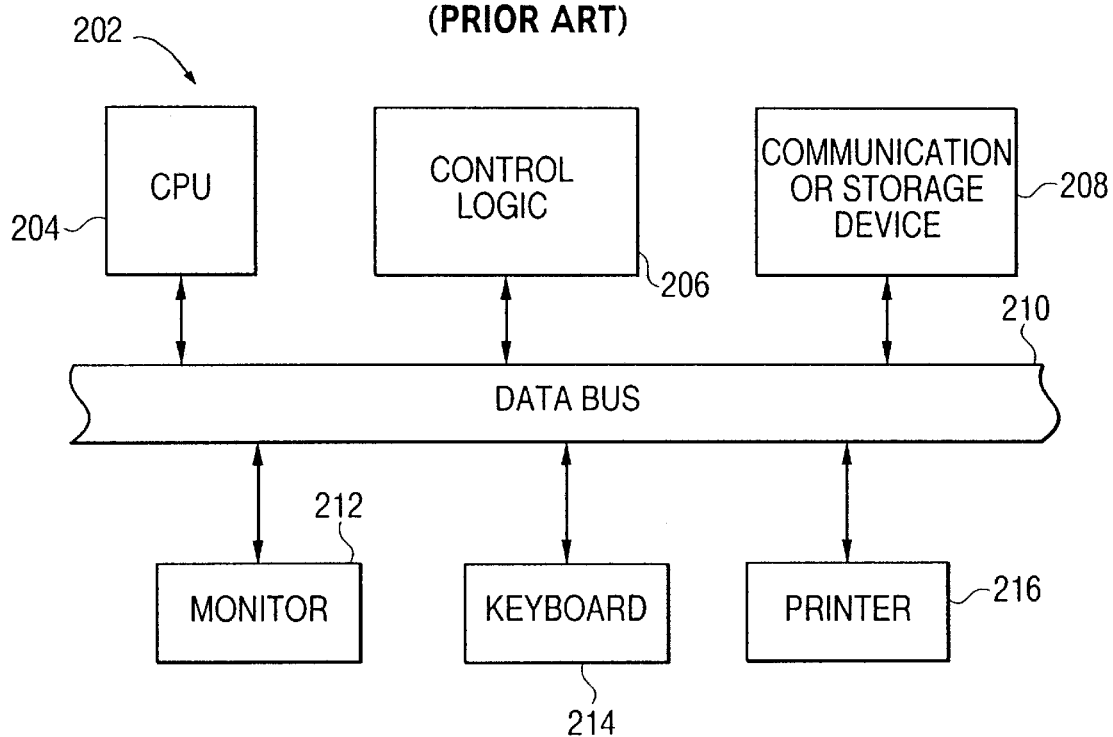
FIG. 2 is a block diagram of a data processor according to an embodiment of the present invention.

A block diagram of the processing systems 110, 112, 114, 116, and 118 is shown in FIG. 2. Preferably, each of the systems 110, 112, 114, 116, and 118 is a data processing device 202 having a central processing unit (CPU) 204 connected to other devices via a data bus 210. The CPU 204 operates in accordance with control logic 206. Control logic 206 is preferably a computer program, such that the CPU 204 operates in accordance with instructions contained in the computer program.

The data processing device 202 also includes a communications or storage device 208, a monitor 212, a keyboard 214, and a printer 216. Communications between the encrypting system 114 and other devices, such as the emergency decrypting system 116, are achieved by operation of the communication or storage device 208, which is any well known transmitter or storage medium.

In accordance with the present invention, the control logic 206 enables the processing systems 110, 112, 114, 116, and 118 (and, in particular, the CPU 204) to operate as discussed herein. Since the control logic 206 preferably represent software, the processing systems 110, 112, 114, 116, and 118 are sometimes called herein "programs". However, it should be understood that such "programs" represent a device 202 operating in accordance with software. Also, according to an alternate embodiment of the invention, the processing systems are implemented entirely in hardware (for example, the CPU 204 and the control logic 206 represent hardware state machine(s)). The invention is also directed to a computer program product (such as a floppy disk or other computer data storage device) having control logic (software) stored therein, wherein such control logic enables a data processing device to achieve the functionality described herein.

1.2. Access Rules

There are two kinds of ARs defined by the present invention, authentication tests and compound authorization rules. An AR is specified by the AR defining system 118 who defines it and sends it to the KRC 110 for registration. In response, the KRC 110 grants the AR defining system 118 an ARI. The encrypting system 114 can then use the ARI to create a KRF or the AR defining system 118 can use the ARI in the definition of other ARs. This interaction between the AR defining system 118 and the KRC 110 is called the registration phase and is described in greater detail below.

The KRC 110, in turn, uses an ARI to locate the associated AR and uses that AR to control challenges to the emergency decrypting system 116 to determine the right to emergency access.

An authentication test is an example of a relatively simple AR. If the emergency decrypting system 116 passes the authentication test, then the emergency decrypting system 116 gains access. More generally, the emergency decrypting system 116 receives either access or a success token, which is used to respond to other challenges. A compound authorization rule, on the other hand, specifies a group of ARIs, some (or all) of which need to be satisfied in order for the AR to be satisfied.

1.2.1. Authentication Tests

In one embodiment, a basic authentication test includes a method for proving one's identity. In particular, it can include shared secrets (e.g., passwords, mother's maiden name, etc.), cryptographic authentication protocols, third party endorsements (e.g., verification that the person presenting data to be validated possesses a pre-specified driver's license and matches the picture, description and signature on that license), biometric tests (e.g., retinal scans), or any other authentication.

Additional authentication tests include multiple prompt/reply pairs. In a multiple prompt/reply pair, an AR defining system 118 can specify a list of N prompts and their associated replies. The AR defining system 118 can also specify a number K ($K \leq N$) such that when the KRC 110 challenges the emergency decrypting system 116 with the N prompts, the authentication test is satisfied if K or more replies are correct. This variation of a shared secret test is provided for potential decryptors who may have trouble remembering a particular typed string but who might remember K of them with greater probability.

Finally, in a preferred embodiment of authentication by shared secret, confidentiality is provided for the reply portion. Specifically, instead of storing the reply as a readable text string, during both registration and responses to challenges, a cryptographically strong hash of the prompt and reply is formed. This hash value is ASCII encoded and sent to the KRC 110 as the reply string. This confidentiality permits an AR defining system 118 to employ embarrassing memories as a reply on the theory that such memories are unlikely to be either forgotten or shared.

1.2.2. Authorization Rules

In one embodiment, a compound authorization rule takes the form:

$$[n, k, ARI1, ARI2, \ldots, ARIn]; k \leq n$$

This rule is satisfied if k of the n ARIs given are satisfied. The ARs referenced by these ARIs may be created by the AR defining system 118 or by other persons known to the AR defining system 118. For example, an AR can be created to represent the authorization rule for a company's corporate emergency access and the ARI can be listed as an optional emergency access method for each employee.

In particular, if the corporation had a corporate ARI=c, and the employee had an individual ARI=e, the employee could create and use an ARI=u defined as u=[2, 1, e, c]. Through this definition, any file which included "u" as the ARI in its KRF is available in case of emergency by satisfying the ARI of either the employee or the corporation.

It should be noted that a group with n=k is equivalent to a logical-AND of the group's rules thus implying that all ARIs must be satisfied. Similarly, a group with k=1 is equivalent to a logical-OR of the group's rules meaning that any one of the ARIs must be satisfied. A group with n=1 and k=1 is an ARI that indirectly references another ARI.

In further embodiments, an AR can include a method for authenticating release of a piece of confidential information upon the occurrence of an event that is independent of the actions or knowledge of a potential decryptor requesting access. For example, the KRC may be authorized to release a piece of confidential information to a specific individual only when that authenticated individual has reached a specified age (e.g., 18). In another example, the KRC may be authorized to release a piece of confidential information (e.g., a will) only after the death has been independently verified. Generally, the AR can be based on the analysis of information that can be (1) provided to the KRC by the emergency decrypting system 116, (2) retrieved by the KRC 110 from a source independent of the emergency decrypting system 116, or (3) known independently by the KRC 110.

1.3.1.4. Third Party Access Rules

Figure 3:
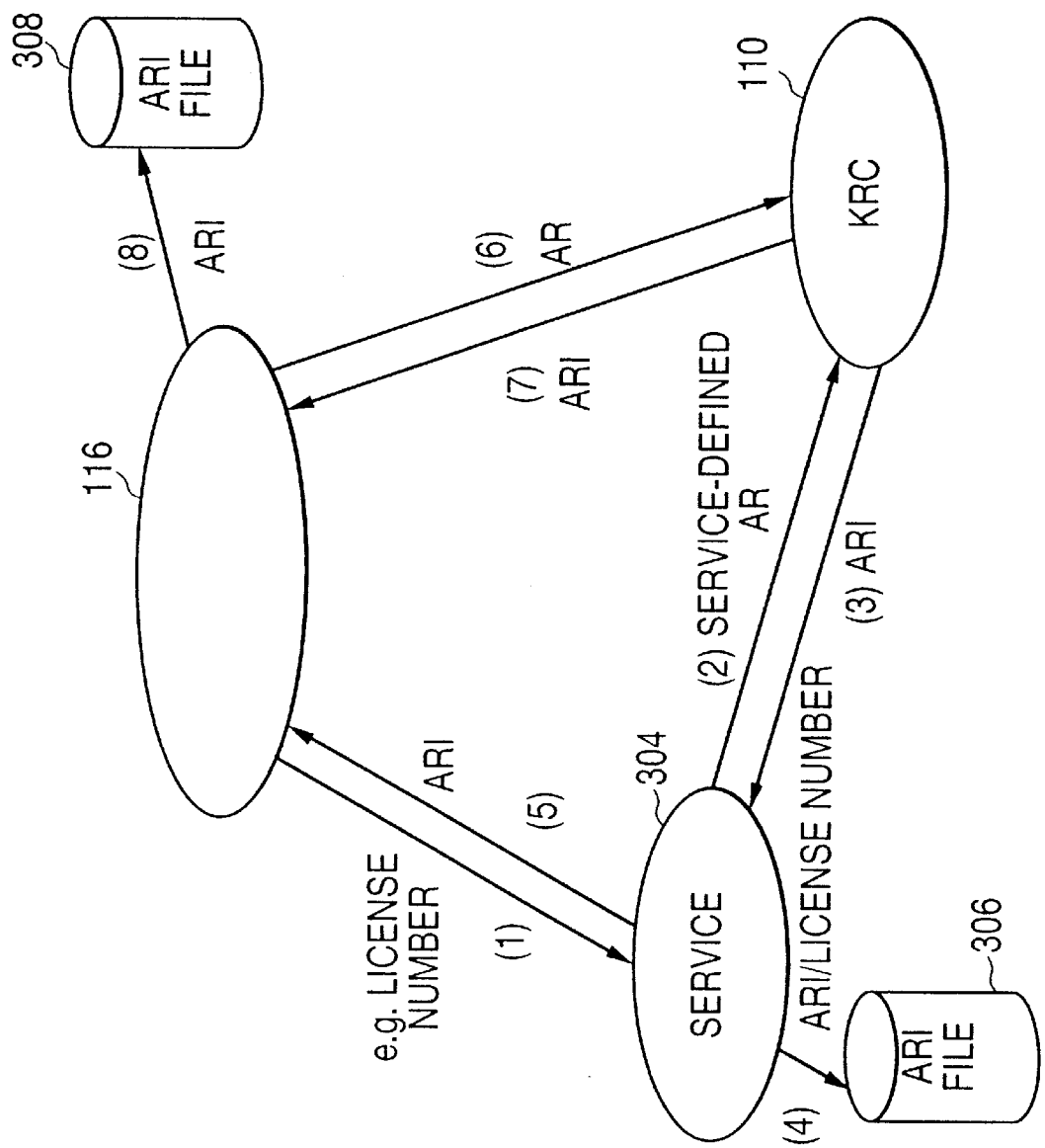

There can be, from the AR defining system's 114 point of view, third-party ARs built using the normal authentication tests and compound authorization rules. For example, an AR defining system 118 might register with some human-staffed service to get authentication by the AR defining system's 118 driver's license or any biometric measure (e.g., palm print, retinal scan, etc.). As shown in FIG. 3, that service (1) receives the AR defining system's 118 license number (without requiring an in-person visit) and (2) generates an AR which only the service 304 could successfully satisfy, (3) receiving an ARI for it, in return. The service 304 next (4) attaches the resulting ARI to a record of the AR defining system's 118 license number in the service's ARI file 306 and then (5) gives the resulting ARI to the AR defining system 118. The AR defining system 118 would (6) make an indirect AR to that ARI (the indirect AR definition is described in more detail below), (7) get an ARI for that new AR, and (8) file that ARI (now owned by the AR defining system 118 rather than the service 304) in the ARI file 308.

1.3. Recovery Process

The emergency access provided by KRC 110 does not take the place of normal access to encrypted data C. It is assumed that the normal access to KS proceeds without paying attention to the KRF. In this situation, the normal decrypting system 112 is the same processing system as the encrypting system 114 and has knowledge of KS or of a method of obtaining KS independent of the KRC 110. Thus, in most cases the KRC 110 will never know that the encrypting system 114 has even created the KRF for encrypted data C.

However, the present invention permits storage or transmission encryption in which the KS is chosen randomly (e.g., by encrypting system 114). Consequently, in this embodiment, the only method of access is via the emergency use of a KRF. By proper definition of ARs, this option permits an encrypting system 114 to implement a key recovery mechanism in which the grantee of the data would hold it at all times in encrypted form, and would receive use of that encrypted data only upon the satisfaction of a potentially complex AR. No individual person, not even the data's original encryptor, would be able to decrypt it without satisfying that AR. To implement this option, one needs only a trusted KRC 110 that would never release the contents of a KRF except upon satisfaction of the corresponding AR. A KRC 110 may be encased in a tamper-resistant enclosure and have no override access defined. In one embodiment, the trusted KRC 110 is highly fault-tolerant through redundancy.

Use of the emergency access capability provided by the KRC 110 involves several separate steps:

(1) Registration,
(2) Listing of Defined AR's,
(3) Creation of KRFs,
(4) Emergency Access Requests,
(5) Challenge-Response Protocol, and
(6) Receipt and Use of Decrypted KRF Data.

In addition to these steps, it should be noted that information to and from the KRC 110 is frequently confidential and therefore, in a preferred embodiment, the implementation of the KRC 110 includes encryption of all transactions between the KRC 110 and the systems 116 and 118. For that purpose, the KRC's public key (KRCpub) is used to communicate a randomly chosen secret key from the AR defining system 118 (or the emergency decrypting system 116) to the KRC 110. In addition, the AR defining system 118 (or the emergency decrypting system 116) includes inside the encrypted request to the KRC 110, which reply key the KRC 110 should use for the return message. In addition to confidentiality, there is also the question of authentication. Since an AR defining system 118 defines an authentication procedure by providing AR definitions during registration, there is no further AR defining system 118 authentication needed for the KRC 110/ AR defining system 118 communication.

The KRC 110 itself, however, requires authentication by well known public key methods. This is accomplished through widespread publication of the KRC's public key using a variety of channels or signatures on the KRC's public key by a key which is either widely known or trusted (or both). If the AR defining system 118 uses an untrusted KRC public key, then the AR defining system 118 is vulnerable to improper behavior by the KRC 110 and will be unable to provide convincing evidence identifying that KRC 110 for the purposes of legal remedy.

1.3.1. Registration

Figure 4:
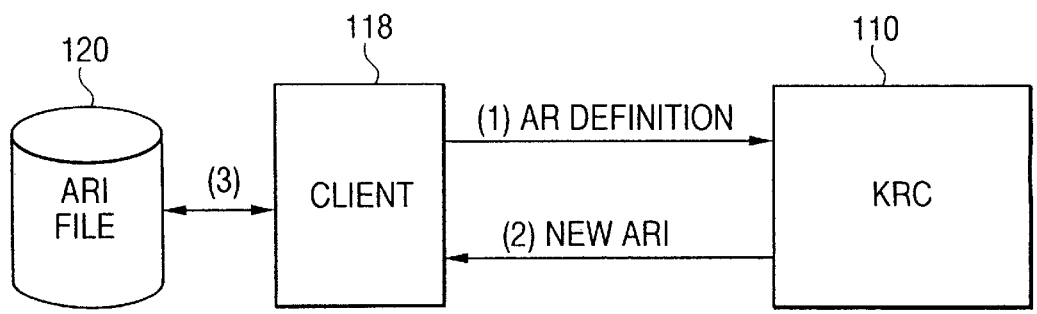
FIGS. 3, 4, and 8 are data flow diagrams depicting the process of access rule definition.

KRC 110 registration (i.e., having an AR defining system 118 register with a KRC 110) involves the creation of ARs and acceptance by the AR defining system 118 of an ARI for each AR. FIG. 4 illustrates generally the AR definition process between an AR defining system 118 and KRC 110. In this overview, the AR definition process comprises the following steps: (1) the AR defining system 118 sends an AR definition to the KRC 110, (2) the KRC 110 sends a new ARI to the AR defining system 118, and (3) the AR defining system 118 files the new ARI with an optional explanatory comment in the ARI file 120.

The ARI is a value created by the KRC 110 that allows the KRC 110 to locate the AR definitions corresponding to the ARI. In one embodiment, the ARI includes an address at which the AR definitions are stored.

The registration process is further represented by a flowchart in FIG. 5. In step 506, the AR defining system 118 obtains a KRC public key (this step is described in Section 1.3.1.1). In step 508, the AR defining system 118 chooses the desired registration interaction. These registration interactions include the acquisition of a new KRCpub in step 512, creating a new AR definition in step 514, redefining an existing AR in step 516, and obtaining an ARI listing in step 518. The acquisition of a new KRCpub is described in section 1.3.1.1, the creation of a new AR is described in sections 1.3.1.2, the redefinition of an existing AR is described in section 1.3.1.3, and the obtaining of an ARI listing is described in section 1.3.2.

1.3.1.1. Acquisition of KRCpub

The initial KRC public key, here labeled KRCpub(0), is available from advertising publications or through messages from other people. The security of further public key distribution hinges on the trustworthiness of this initial key because public key authentication techniques cannot establish absolute trust. Rather they can establish only equivalency of trust.

The KRC 110 generates new KRC public keys from time to time, in order to minimize the volume of data which achieves emergency access under any one key. The greater the volume that can be accessed under one key the greater the temptation for an adversary to attempt to break that particular key The KRC 110 retains all generated KRC public-key/private-key pairs, so that an emergency decrypting system 116 can initiate a secure communication using any of the KRCpub keys.

After a trusted KRC public key is obtained by an AR defining system 118, the KRC 110 returns a signed version of that KRC public key to the AR defining system 118 (step 506 in FIG. 5). The most current KRC public key is returned in every KRC 110 interaction with any AR defining system 118 as a text block appended to the KRC's normal message. On a special request by the AR defining system 118, wherein the AR defining system 118 sends the number "i" (desired key number) and "k" (old key number), the KRC 110 will return the new key, KRCpub(i), signed by a prior key, KRCpub(k), of the encrypter's choice.

1.3.1.2. Creation of a new Access Rule

FIG. 6 illustrates the process of creating a new AR that begins with step 606 where an AR defining system 118 sends an AR definition to the KRC 110 which records that definition. In step 608, the KRC 110 returns an ARI to the AR defining system 118. The AR defining system 118 receives this ARI in step 610 and, after attaching an optional descriptive comment provided by the AR defining system 118, appends the ARI record to the ARI file 120. The ARI file 120 already contains the KRCpub and any other ARIs which the AR defining system 118 has already acquired.

Figure 7:
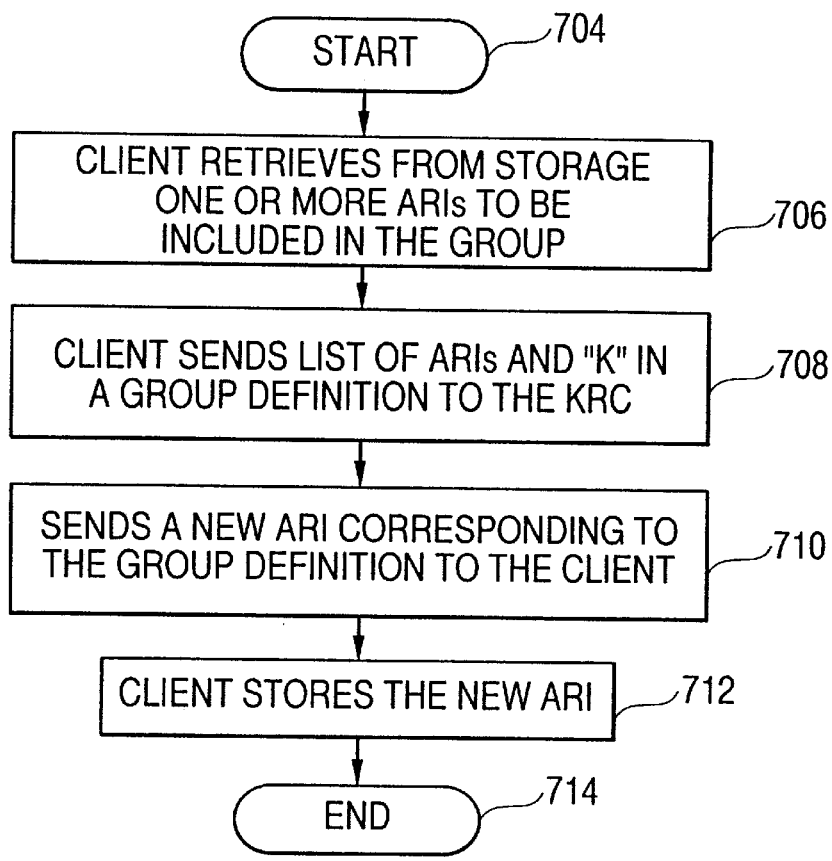

FIG. 7 illustrates the process of generating a group authorization rule. First, in step 706, an AR defining system 118 retrieves from the ARI file 120 one or more ARIs to be included in the group authorization rule. The AR defining system 118 sends that list of ARIs in a group authorization rule definition to the KRC 110 in step 708, along with a number "K" indicating the number of group elements that must be satisfied to satisfy the group authorization rule, and receives from the KRC 110 an ARI corresponding to that group authorization rule in step 710. Finally, in step 712, the AR defining system 118 stores the new ARI in the ARI file 120.

Figure 8:
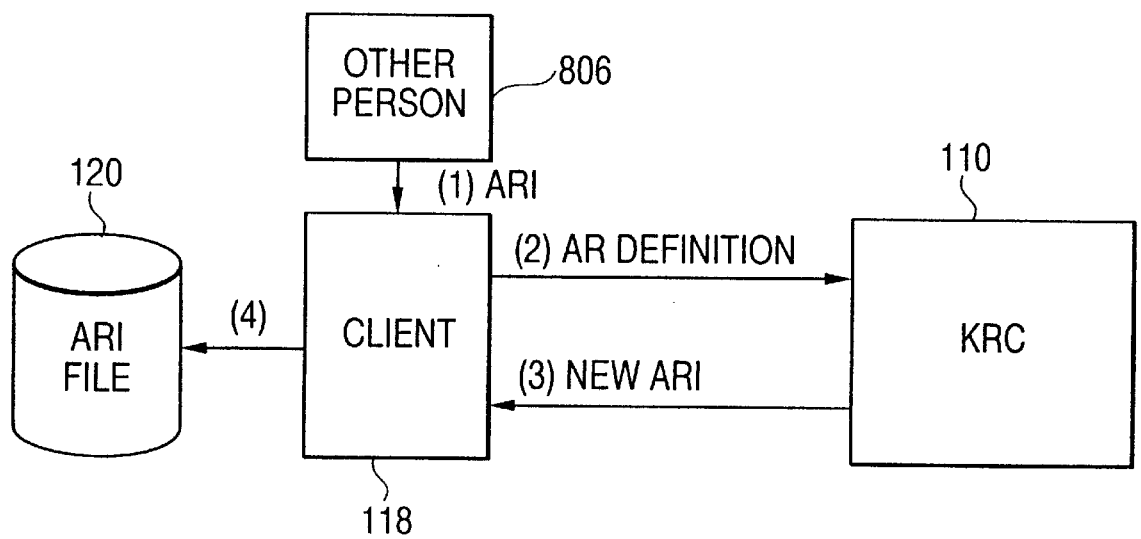

As shown in FIG. 8, the creation of an indirect AR proceeds similarly but refers to someone else's ARI. In that case, the other person's 806 ARI would (1) arrive by some trusted communications channel rather than from the AR defining system's 114 own ARI file 120. The rest of the process (2)–(4) is the same as the AR definition process described above.

1.3.1.3. Re-definition of an existing Access Rule

FIG. 9 illustrates the process wherein an AR defining system 118 desires to change the definition of an existing AR. Although an AR defining system 118 is free to generate new ARs at will, a re-definition is required when there already exist encrypted files and the AR defining system 118 decides to change the emergency access procedure for those existing encrypted files. To perform this re-definition, the AR defining system 118 in step 906 sends to the KRC 110 the new AR definition and also the ARI corresponding to the AR to be re-defined. The AR defining system 118 is then challenged by the KRC 110 in step 908 with the ARs referenced by the old ARI. If the AR defining system 118 fails the challenge issued by the KRC 110, the redefinition request is denied in step 910. If the AR defining system 118 successfully meets the challenge the AR defining system 118 is allowed to change the AR definitions corresponding to that ARI in step 912. For the embodiment where the KRC 110 records an AR defining system's 118 network address with each defined ARI, the request for re-definition must come from that network address.

1.3.2. Listing of Defined ARIs

An AR defining system 118 can also ask for a listing of the status of all ARs defined by that AR defining system 118. In one embodiment, the identification of an AR defining system 118 is by network address. In other embodiments, it could be by way of an AR and its ARI defined only for the purpose of identifying ownership of ARs or it could be whatever identification method is normal to the network or communications connection used by the KRC 110. However, if a KRC 110 is designed to mask network addresses, an ARI can also serve as an owner identifier. In this embodiment, the owner presents his identifying ARI while asking for a listing. The KRC 110, would then challenge the owner to prove their identity (using the identifying ARI) and only then provide the listing.

1.3.3. Key Recovery Field

The preferred mode of this embodiment avoids the splitting of KS. Clearly, in alternative modes, key splitting remains a possible implementation should an encrypting system 114 desire it.

It should be noted that in alternative embodiments US need not be a secret key (i.e., encrypting key). The datum inside a KRF can be any datum which the encrypting system 114 wishes to encrypt and store. The enclosure of such a datum inside a KRF is functionally equivalent to the encryption of that datum with a secret key (KS) generated at random. The randomly generated KS is included within the KRF attached to the encrypted data and forces the owner to access the encrypted data through an emergency decrypting system 116.

Figure 10:
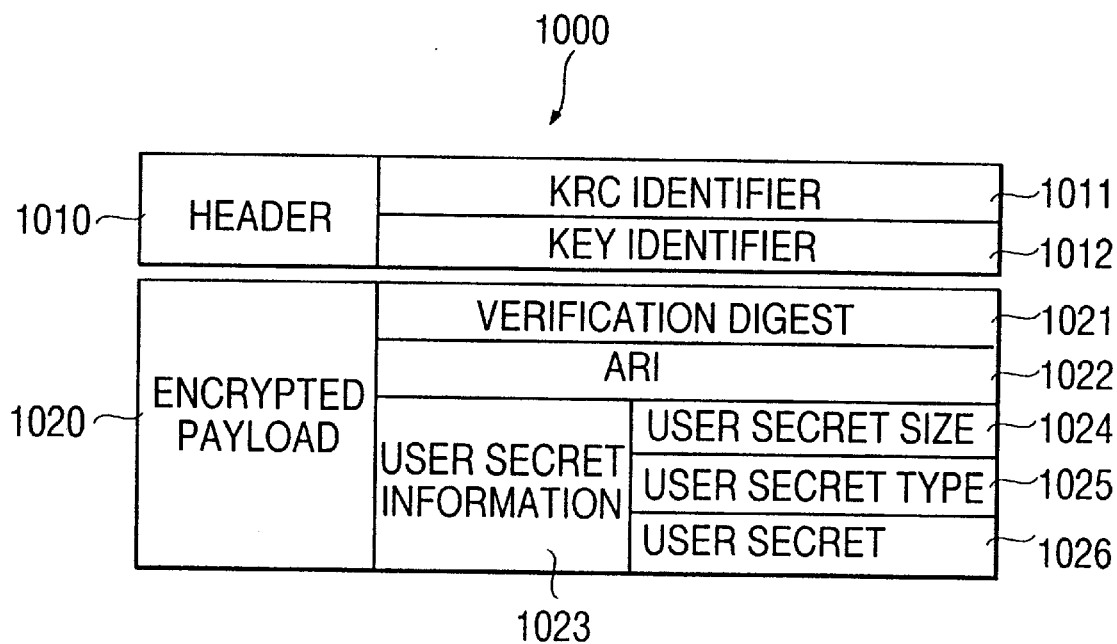
FIG. 10 illustrates a first embodiment of the construction of a key recovery field.

FIG. 10 illustrates one embodiment of the construction of a KRF. As illustrated, KRF 1000 includes a header section 1010 and an encrypted payload section 1020. Header section 1010 includes KRC identifier field 1011 and key identifier field 1012. The combination of values in the KRC identifier field 1011 and key identifier field 1012 uniquely identifies the KRC and the KRCpub used to encrypt the payload section 1020. In one embodiment, the KRC identifier in KRC identifier field 1011 is an X.500 distinguished name of the issuing authority that issues the KRC public key certificate, and the key identifier in key identifier field 1012 includes the serial number of the KRC public key certificate issued by the issuing authority. As would be apparent to one of ordinary skill in the relevant art, header section 1010 can also include additional information necessary to accommodate decryption of the payload. This additional information is implementation dependent.

The encrypted payload section 1020 of KRF 1000 is encrypted using KRCpub. The corresponding KRCpriv is stored in KRC 110 and is identified by the information contained in KRC identifier field 1011 and key identifier field 1012 of unencrypted header section 1010. As would be apparent to one of ordinary skill in the relevant art, the KRC identifier field 1011 and the key identifier field 1012 can include various types of information that would uniquely identify the KRC and the KRCpub that is used to encrypt payload section 1020.

Specifically, encrypted payload section 1020 includes verification digest field 1021, ARI field 1022, and user secret information field 1023. Verification digest field 1021 includes information that verifies the integrity of the encrypted payload 1020 contents after decryption and further binds the header information to the encrypted payload 1020. In one embodiment, the verification digest in verification digest field 1021 is of the form SHA-1 (Header ||ARI ||US). As would be apparent to one of ordinary skill in the relevant art, the binding process can be accomplished in various ways. The specific form of the binding digest is not intended to limit the scope of the present invention.

The ARI in ARI field 1021 is selected by the encrypting system 114, depending on which AR the encrypting system 114 wants to use. The chosen ARI enables the KRC 110 to identify a specific AR which will be used as the basis for the presentation of a challenge to an emergency decrypting system 116.

In the preferred embodiment, user secret information field 1023 further includes user secret size field 1024, user secret type field 1025, and user secret field 1026. Through the provision of user secret size field 1024, user secret type field 1025, and user secret field 1026, KRF 1000 can accommodate a variety of types of user secrets (e.g., encryption key). The user secret in user secret field 1026 is often (but not limited to) a symmetric data encryption key (i.e., KS). More generally, the user secret can be any data to which the encrypting system 114 wants to control access. As would be apparent to one of ordinary skill in the relevant art, a user secret information in user secret information field 1023 can be represented in various forms.

To support KRF 1000 verification, the encrypting system 114 also generates a RVF. In this embodiment, the RVF includes the ARI and a pseudorandom padding value optionally encrypted by an encryption key (e.g., KS).

Finally, since the KRF provides the encrypting system 114 with a service, there is no need to strongly enforce its correct construction. The encrypting system 114 is not inclined to circumvent a service he desires, uses voluntarily and possibly paid some amount of money to acquire. In addition, any refusal to decrypt based on an incorrect KRF is an inappropriate action for storage encryption. The damage of a bad KRF is done at the time of encryption and detection of an incorrect KRF at decryption time is ineffective.

1.3.4. Emergency Access Requests

When an emergency decrypting system 116 needs to decrypt a file whose KS is available inside a KRF and the normal access to KS fails, the emergency decrypting system 116 can use the KRF attached to the file. More generally, whenever the emergency decrypting system 116 needs whatever US is contained within the KRF, the emergency decrypting system 116 can issue an emergency access request to the KRC 110.

Figure 11:
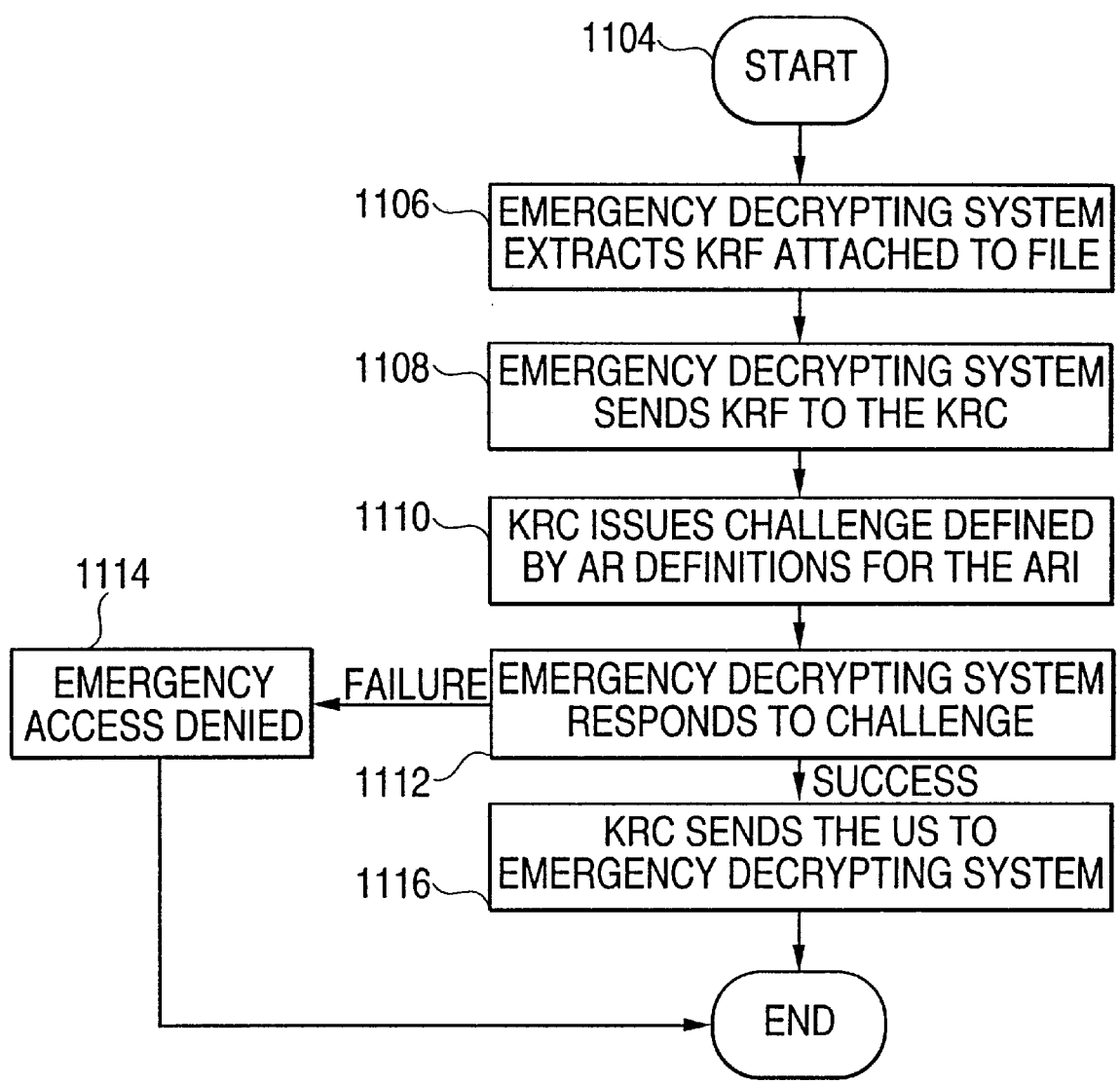
FIG. 11 is a flow chart depicting the processing of emergency access requests.

FIG. 11 illustrates the method of obtaining emergency access. First, in step 1106, the emergency decrypting system 116 extracts from the storage medium 122 the KRF that is attached to the encrypted data of interest (or the KRF alone if that is what is of interest) and then, in step 1108, sends the extracted KRF to the KRC 110. Again, it should be noted that the KRF can be received over a communication channel 122. In step 1110, the KRC 110 issues a challenge defined by the AR definition referenced by the ARI in the extracted KRF.

Figure 12:
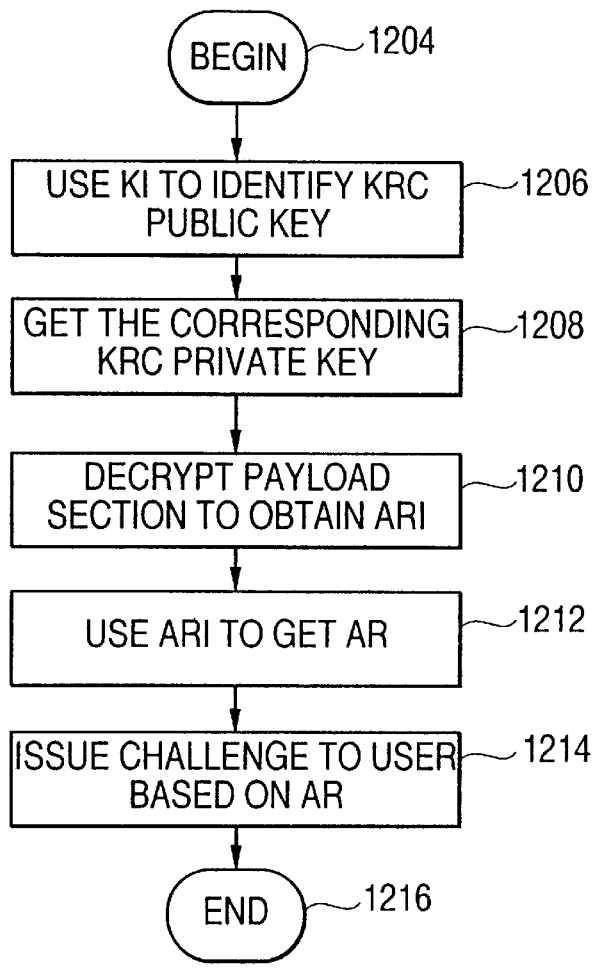
FIG. 12 is a data flow diagram depicting a retrieval of an access rule from a key recovery field.

FIG. 12 illustrates the processing steps performed by KRC 110 in issuing the challenge to the emergency decrypting system 116. First, in step 1206, the KRC 110 uses the key identifier 1012 to identify KRCpub then retrieves, in step 1208, the KRC private key corresponding to that particular KRCpub. In step 1210, the KRC 110 decrypts payload section 1020 to obtain the ARI. Finally, the KRC 110, in step 1212, uses the ARI to locate the corresponding AR (e.g., AR residing at the address ARI) and challenges the emergency decrypting system 116 in step 1214.

Referring again to FIG. 11, if the emergency decrypting system 116 fails to meet the challenge in step 1112, emergency access is denied in step 1114. If the emergency decrypting system 116 meets the challenge in step 1112, the KRC 110 sends the US 1024 to the emergency decrypting system 116 in step 1116. In other recovery scenarios where the KRF and the encrypted data C are sent to the KRC, the KRC will send the decrypted data, D, to the emergency decrypting system 116.

In one embodiment, step 1106 is performed by the software which initially created the encrypted data and the KRF. In this embodiment, the location of the KRF within or alongside the encrypted data (or database record, or whatever item is encrypted) is under the control of some application software rather than the KRC 110 or its encrypting system 114.

In one embodiment, steps 1108 through 1116 are performed by the software in the emergency decrypting system 116, to provide an easy, seamless interface to the KRC 110. In a preferred embodiment, application software writes the KRF to a file in step 1106 and retrieves the US from a file, allowing steps 1108 through 1116 to be performed by a separate application which is purely a KRC client.

According to one embodiment, steps 1108 and 1116 involve well known methods for providing secure transmission of information. The preferred embodiment uses symmetric encryption with a secret key chosen at random by the emergency decrypting system 116. That key is encrypted in KRCpub and communicated (along with a KI 1012 to identify the key used) to the KRC 110 along with the encrypted message. That message includes a command to the KRC 110 to use a given (randomly chosen) key for communications back to the emergency decrypting system 116 in step 1118. In this manner, the emergency decrypting system 116 does not need to create a public key for key transmission purposes.

1.3.5. Challenge-Response Protocol

Figure 13:
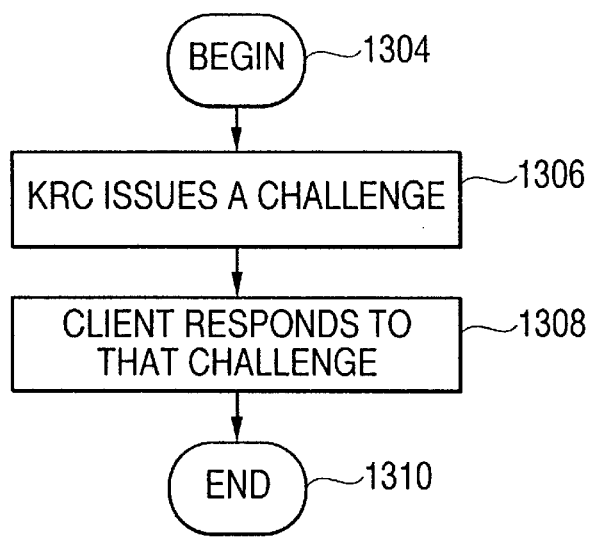
FIG. 13 is a flow chart of an exemplary challenge-response cycle.
Figure 14:
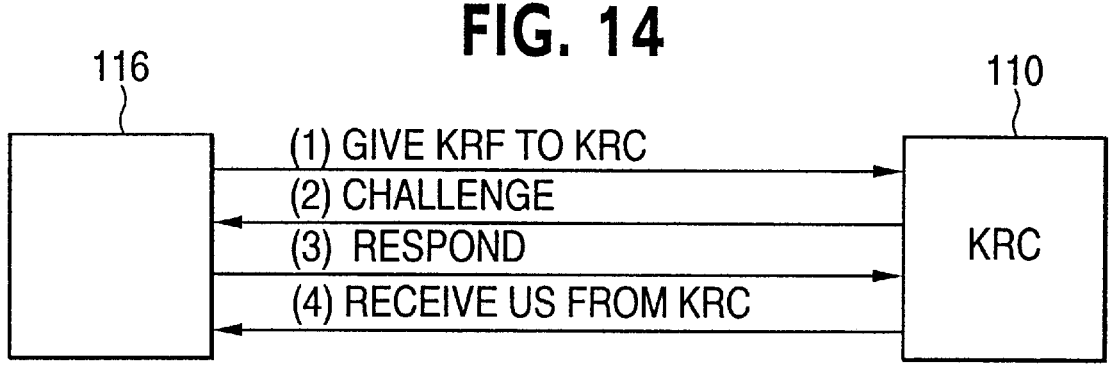
FIG. 14 is a data flow diagram depicting a challenge-response cycle embedded within an emergency access request.

The process of responding to challenges mirrors the nested structure of the relevant AR definition. FIG. 13 shows the challenge-response cycle. In step 1306, the KRC 110 issues a challenge (which can be thought of as a remote-procedure-call [RPC]) and the AR defining system 118 or emergency decrypting system 116 responds to that challenge in step 1308. FIG. 14 shows this cycle as it pertains to an emergency access request.

If the ARI identifies an AR representing a simple authentication test, then the emergency decrypting system 116 has all of the information to provide the correct response. However, if the ARI specifies an AR representing a group or indirect AR, then the emergency decrypting system 116 needs to perform non-local work in order to get the correct response. This non-local work will involve further nested RPCs. If the ARI specifies an indirection, then the RPC is from one emergency decrypting system 116 to another emergency decrypting system 116. In various situations, the RPC could involve network communication or merely the hand-carrying of data on a floppy disk (e.g., if the indirection is for the purpose of physical authentication).

For every challenge issued by the KRC 110, the KRC 110 includes a sequence token (SEQ). The SEQ is an encrypted datum which only the KRC 110 can decrypt and which includes the recursive stack of challenges along with the transaction number and a strong checksum on the contents of the SEQ (to detect tampering). For example, if ARI=17 specifies a group of which ARI=5 is a member, the first Sequence token will list a recursion depth of 1 and the set [17] as the stack. The emergency decrypting system 116 is then challenged with a group challenge that lists the members of the group. The decrypting system 116 chooses one of these to satisfy first, for example 5, and recursively calls the KRC 110 to challenge the emergency decrypting system 116 to satisfy ARI=5. That recursive call includes the SEQ which the KRC 110 provided with the group challenge. When the KRC 110 performs the recursive RPC, calling the emergency decrypting system 116 to satisfy ARI=5, that call will include a SEQ listing a recursion depth of 2 and a stack of [17,5].

In a preferred embodiment, there are two conditions under which the KRC 110 issues a challenge to an emergency decrypting system 116. In the first condition, the emergency decrypting system 116 submits a KRF 1000 for emergency access. This submission includes no other information and starts a new transaction. If this challenge gets a correct response, the KRC 110 returns the US.

In the second condition, the emergency decrypting system 116 submits a request to be challenged as part of fulfilling a group or indirection. This submission includes a SEQ identifying the transaction and recursive stack of which this recursive challenge is a part. The emergency decrypting system 116 submitting that request need not be the same emergency decrypting system 116 who submitted the KRF 1000 which started this transaction. If this challenge gets a correct response, the KRC 110 returns a SUCCESS token which includes the same information as the SEQ along with the fact of success.

In response to a simple challenge (a prompt/reply or a digital signature, for example), the emergency decrypting system 116 replies with the SEQ and the correct response. In return, the KRC 110 provides either the US or a SUCCESS token.

In response to a group or indirect challenge, the emergency decrypting system 116 provides one or more SUCCESS tokens which the KRC 110 verifies as being part of this transaction and as correctly satisfying the group or indirect AR. In return, the KRC 110 provides either the US or a SUCCESS token.

In addition, in a preferred embodiment, to keep from having either the KRC 110 or the emergency decrypting system 116 maintain state (i.e., the contents of all variables which will be used by the computer program issuing the RPC between getting the answer from the RPC and returning to the program's caller) across RPCs, the KRC 110 includes a state token with every RPC it initiates and the emergency decrypting system 116 includes a state token with every RPC it initiates. The responder to the RPC returns that token, if any, with its response. Those tokens are encrypted in a key known only to the originator and include information to permit the originator to verify that the token goes with the SEQ with which it is accompanied.

As a result, the state of the KRC 110 and emergency decrypting system 116 are maintained over this recursive set of RPCs in which the identity of the caller keeps changing hands.

1.3.6. Receipt and Use of the KS

In one possible recovery scenario, the successful completion of an emergency access request is the return of the US to the emergency decrypting system 116. As noted, in other recovery scenarios, the KRC 110 returns decrypted data, D, to the emergency decrypting system 116.

The purpose of the challenge-response is to verify that the emergency decrypting system 116 making the request is authorized to receive the US. Once the US is returned to the emergency decrypting system 116, the software of the emergency decrypting system 116 has the responsibility for using the US to provide access to the data (e.g., for using the US to decrypt encrypted data C). Again, it should be noted that in other applications, the US itself could be the information desired (e.g., a safe combination). In this case there is nothing extensive needed in the software which receives the US.

1.4. Override Access

In some embodiments, an override access is provided. Specifically, in response to any challenge from the KRC 110 for satisfaction of an AR, the challenged emergency decrypting system 116 may respond "override". The emergency decrypting system 116 is then challenged according to an override AR defined for that KRC 110. For example, the override AR could require that 3 of 5 previously designated company officers agree to override. The definition of such a policy is via the AR mechanism described earlier (and further described below).

The same effect is also achieved by having the AR defining system 118 always define and use a compound authorization rule as described earlier (e.g., u =[2, 1, e, c]). However, the override mechanism saves the AR defining system 118 time in registration and provides a guarantee that a supervising entity (such as management) will be allowed access to all files, independent of any actions on the part of any employee.

Note that in some recovery scenarios, override access (e.g., law enforcement) may be the only type of access available. In this scenario, the ARI in the KRF can be set as the default ARI (e.g., 0). This same type of functionality can also be achieved by deleting the ARI field or setting the ARI to a NULL value.

1.5. KRF verification

It is possible that an encrypting system 114, without any intended malice, uses a version of software which doesn't attach KRFs to data (possibly because that option isn't enabled at the time), or which mistakenly attaches (through a flaw in the software) an incorrect KRF, or which incorrectly constructs KRFs.

One option for detecting such problems and minimizing the extent of the potential damage is the reconstruction of KRFs. Since accessing KRFs is a very infrequent occurrence, any time delay in detecting bad KRFs is likely to be less than the time until the KRF is needed, thus permitting the encrypting system 114 time to recreate a proper KRF.

If a KRF is of the form that is re-built (by using the public key algorithm to build the KRF directly, rather than by having the public key algorithm encrypt a secondary secret key, $KS_s$, which is in turn used to encrypt the KRF contents), and if the encrypting system 114 has attached a RVF, then the emergency decrypting system 116 can verify the KRF by reconstructing it. In the KRF embodiment illustrated in FIG. 10, the accompanying RVF can include the ARI and a pseudorandom padding value optionally encrypted with an encryption key (e.g., KS).

Since this reconstruction is a time-consuming operation and since the purpose of this reconstruction is to make the encrypting system 114 more vigilant about the software being used, one embodiment envisions that the decrypting software reconstructs only a randomly selected set of all KRFs. It is expected that the knowledge that this reconstruction occurs occasionally is enough to increase encrypting system 114 vigilance.

2. Second Embodiment of the KRF

Figure 15:
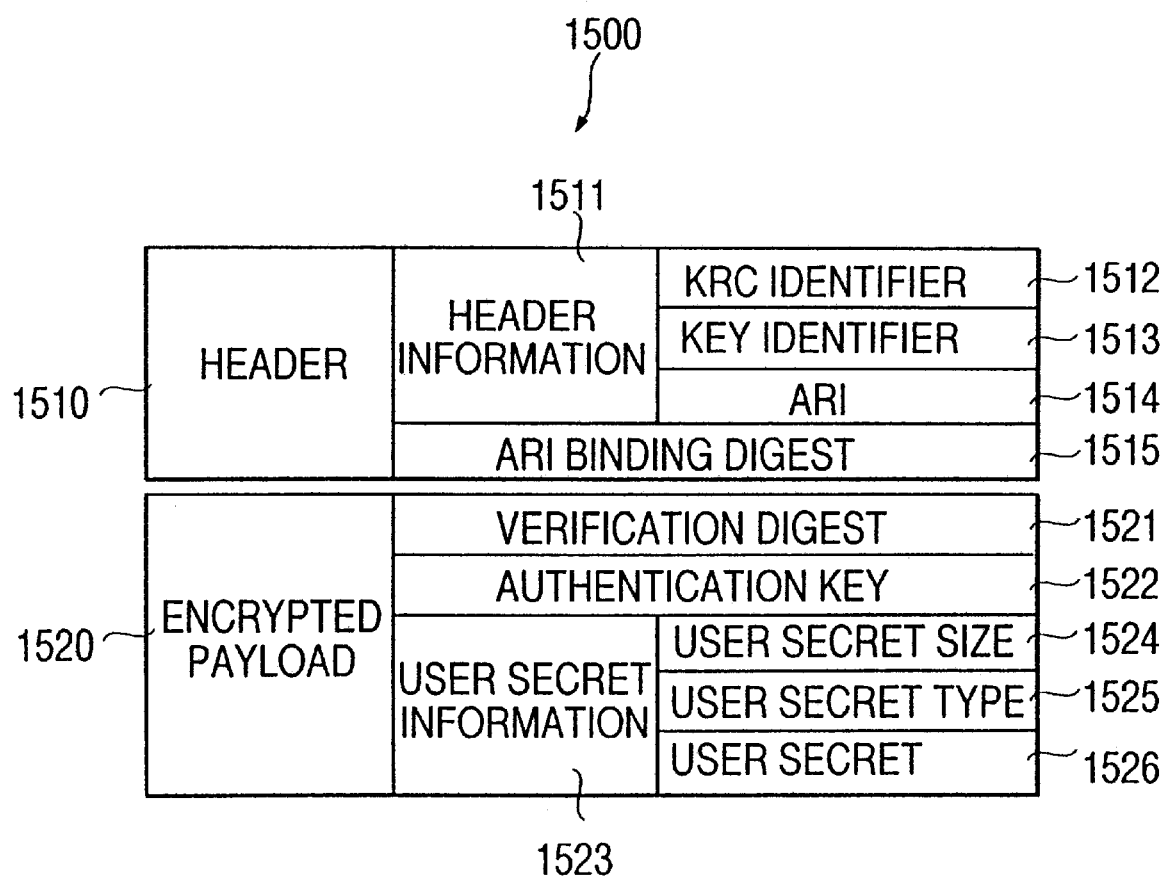
FIG. 15 illustrates a second embodiment of the construction of a key recovery field.

FIG. 15 illustrates a second embodiment of a KRF. As illustrated, KRF 1500 includes a header section 1510 and an encrypted payload section 1520. Header section 1510 includes header information field 1511 and ARI Binding Digest field 1515. Header information field 1511 includes KRC identifier field 1512, key identifier field 1513, and ARI field 1514.

KRC identifier field 1512 and key identifier field 1513 are identical to the corresponding fields in the first embodiment of KRF 1000 illustrated in FIG. 10. Again, as would be apparent to one of ordinary skill in the relevant art, the KRC identifier field 1512 and the key identifier field 1513 can include various types of information that would uniquely identify the KRC and the KRCpub that is used to encrypt payload section 1520. As would be further apparent to one of ordinary skill in the relevant art, header information field 1511 can also include additional information necessary to accommodate decryption of the payload. This additional information is implementation dependent.

In contrast to KRF 1000 of the first embodiment, ARI field 1514 of KRF 1500 is included as part of the unencrypted header section 1510. Accordingly, the ARI is included as part of the clear text portion of KRF 1500. To prevent the ARI (and/or other header information) from being exchanged, altered, or corrupted, the ARI binding digest in ARI binding digest field 1515 protects the integrity of the ARI and other header information in the unencrypted header section and securely binds it with the encrypted payload section 1520, which contains the user secret.

As would be apparent to one of ordinary skill in the relevant art, the binding process can be accomplished in various ways. The specific form of the binding digest is not intended to limit the scope of the present invention. In one embodiment, the ARI binding digest is of the form:

H1 XOR H2, where

H1=HMAC-SHA-1-96 [Key=Ka1] (Header Information ||Encrypted Payload), and

H2=HMAC-MD5-96 [Key=Ka2] (Header Information Encrypted Payload)

Here, Ka1 and Ka2 are the authentication keys that are included within authentication key field 1522, and the header information represents at least a concatenation of the values represented by header information 1511.

In a similar manner to KRF 1000 of the first embodiment, the payload section 1520 of KRF 1500 is encrypted using KRCpub. The corresponding KRCpriv is stored in KRC 110 and is identified by the information contained in KRC identifier field 1512 and key identifier field 1513 of unencrypted header section 1510. As noted, KRC identifier field 1512 and key identifier field 1513 includes whatever information that is necessary to uniquely identify the KRCpub/KRCpriv key pair.

Specifically, payload section 1520 includes verification digest field 1521, authentication key field 1522, and user secret information field 1523. User secret information field 1523 further includes user secret size field 1524, user secret type field 1525, and user secret field 1526. Through the provision of user secret size field 1524, user secret type field 1525, and user secret field 1526, KRF 1500 can accommodate a variety of types of confidential information (e.g., encryption key). As noted earlier, it would be apparent to one of ordinary skill in the relevant art, that a user secret information in the user secret information field 1023 can be represented in various forms.

Authentication key field 1522 includes information that can be used to verify the integrity of the ARI binding digest. In one embodiment, authentication key field 1522 includes the values Ka1 and Ka2. More generally, authentication key field 1522 includes a single value containing whatever authentication keys are needed to verify the ARI binding digest.

Finally, verification digest field 1521 includes information that verifies the integrity of the encrypted payload contents after decryption and further binds the header information to the encrypted payload 1520. It should be noted that the verification digest field 1521 does not represent authentication information. In one embodiment, the verification digest is of the form:

H3||H4, where

H3=SHA-1 (KRC Identifier ||Key Identifier ||Ka1 ||Ka2), and

H4=MD5 (KRC Identifier ||Key Identifier ||Ka1||Ka2)

As noted, ARI field 1514 in the second embodiment has been moved from the encrypted payload section 1520 to the unencrypted header section 1510. In an abbreviated representation, KRF=AR||[KS]KRCpub. Generally, the ARI can appear as cleartext because the ARI does not represent authentication information. Knowledge of the ARI by a potential decryptor will not enhance the decryptor's chances of gaining unauthorized access to the user secret encrypted within the KRF because the ARI merely represents an index to an access rule. The ARI does not itself represent authentication information. In other words, this alternative KRF format is permissible because the ARI does not represent actual authentication information that will be directly used by the KRC 110 in determining whether a potential decryptor is authorized to receive the user secret. As the ARI is included as part of the unencrypted header section, it is subject to the threat of exchange, alteration, or corruption. However, this threat is countered by the ARI binding digest as described above.

The ARI binding digest does not represent authentication information. Like the ARI, the ARI binding digest is preferably included as part of the unencrypted header section.

Knowledge of the cleartext ARI does provide some useful information to a potential decryptor. For example, assume that multiple KRFs 1500 are generated and attached to encrypted data C. These multiple KRFs 1500 are of the form:

$$KRF_1 = ARI_1 \| [KS]KRCpub$$
$$KRF_2 = ARI_2 \| [KS]KRCpub$$
$$\vdots$$
$$KRF_N = ARI_N \| [KS]KRCpub$$

Note that these abbreviated representations of the multiple KRFs do not include all the fields illustrated in FIG. 15. The abbreviated representation of the multiple KRFs is chosen merely for the purposes of explanation.

As illustrated, each of the KRFs includes a separate cleartext $ARI_1, ARI_2, \ldots, ARI_N$ that is individually defined for one of a plurality of authorized decryptors. In other words, each separate $ARI_1, ARI_2 \ldots, ARI_N$ references a separate AR.

In the recovery process, based on inspection of at least the cleartext ARI, a potential decryptor selects the $KRF_i$ that the potential decryptor knows is associated with him. More specifically, the potential decryptor selects the $KRF_i$ that includes the $ARI_i$ that the potential decryptor knows references an AR that the potential decryptor can satisfy. This selected $KRF_i$ is then sent to the appropriate KRC.

The present invention supports many procedures for generating $KRF_1 \ldots KRF_N$. For example, according to one procedure, $KRF_1 \ldots KRF_N$ are each generated using a single KRCpub from a single KRC. According to a second procedure, each $KRF_i$ is generated using a distinct $KRCpub_i$, where each corresponding $KRCpriv_i$ is stored in a single KRC. According to a third procedure, $KRF_1 \ldots KRF_N$ are generated using distinct $KRCpub_1 \ldots KRCpub_N$, where the corresponding $KRCpriv_1 \ldots KRCpriv_N$ are stored in distinct KRCs.

The present invention also supports any combination of these three procedures for generating $KRF_1 \ldots KRF_N$. Where N=6, for example, $KRF_1$ and $KRF_2$ could be generated using $KRCpub_1$ from $KRC_A$. $KRF_3$ and $KRF_4$ could be generated using $KRCpub_3$ and $KRCpub_4$, respectively, from $KRC_B$. $KRF_5$ and $KRF_6$ could be generated using KRCpub, and $KRCpub_6$, respectively, from $KRC_C$ and $KRC_D$, respectively.

As demonstrated by the first and second embodiments described above, the ARI can exist either as part of the encrypted payload section 1520 or as part of the unencrypted header section 1510. Generally, the ARI can appear as clear text because the ARI does not represent authentication information. Accordingly, simple knowledge of the ARI by a potential decryptor will not enhance the decryptor's chances of gaining unauthorized access to the recoverable item encrypted within the KRF.

To support KRF 1500 verification, the encrypting system 114 also may generate a RVF. In this alternative embodiment of the KRF 1500, the RVF includes the authentication keys and a pseudorandom padding value encrypted by an encryption key (e.g., KS). In this second embodiment, the ARI appears as clear text and is not needed for reconstruction purposes.

3. Alternative KRF Formats

In alternative scenarios, access to a user secret can be achieved through one or more KRFs that are generated using a plurality of KRCpubs. Here, each KRCpub can be associated with a separate KRC. In these scenarios, multiple KRCs individually control, in whole or in part, the recovery of the US. The three multiple KRC scenarios described below are termed OR-Access, AND-Access, and Quorum-Access. Cryptographic sealing based on OR-Access, AND-Access, and Quorum-Access is described in D. K. Gifford, "Cryptographic Sealing for Information Secrecy and Authentication", in Communications of the ACM, vol. 25, no. 4, pp. 274–286, April 1982, herein incorporated by reference.

In OR-Access, a plurality of KRFs are generated. Each KRF is generated using a KRCpub$_i$ that is associated with a separate KRC$_i$. Each public key, KRCpub$_1$ . . . KRCpub$_N$, is used to control access to the same US. The plurality of KRFs can be expressed as:

$$KRF_1 = [US]KRCpub_1$$
$$KRF_2 = [US]KRCpub_2$$
$$\vdots$$
$$KRF_N = [US]KRCPub_N$$

Note that the abbreviated representations of $KRF_1 \ldots KRF_N$ do not include the ARI and other fields illustrated in the embodiments of FIGS. 10 and 15. Generally, the abbreviated representations for $KRF_1 \ldots KRF_N$ can be based on either KRF embodiment.

As noted, each of the KRFs is generated using a separate KRCpub, that is associated with one of a plurality of KRCs. In other words, each separate KRCpub, has a corresponding KRCpriv$_i$ that is stored in a different KRC.

In the recovery process, a potential decryptor can use any one of $KRF_1 \ldots KRF_N$ to gain access to the US. The potential decryptor sends the selected $KRF_1$ to the associated KRC that stores the corresponding KRCpriv$_i$.

One example of this scenario is where two KRFs, $KRF_A$ and $KRF_B$, are attached to an encrypted message that is transmitted from country A to country B. In this example, a $KRC_A$ in country A stores the $KRCpriv_A$ that can be used to decrypt the encrypted payload of $KRF_A$. Similarly, a $KRC_B$ in country B stores the $KRCpriv_B$ that can be used to decrypt the encrypted payload of $KRF_B$. In this manner, access to the US (i.e., symmetric encryption key used to encrypt the transmitted message) can be achieved in either country A or country B.

In AND-Access, a single nested KRF is generated using a plurality of public keys, KRCpub$_1$ . . . KRCpub$_N$). In the same manner as the OR-Access, each KRCpub$_i$ is associated with a separate KRC$_i$. The KRF can be expressed as:

$$KRF=[\ldots [[US]KRCpub1]KRCpub_2]\ldots]KRCPUb_N$$

Note again that the abbreviated representation of the nested KRF does not include the ARI and other fields illustrated in the embodiments of FIGS. 10 and 15. Generally, the abbreviated representation for the nested KRF can be based on either KRF embodiment.

As illustrated, the encrypted payload, which includes the US, is encrypted using a plurality of public keys, KRCpub$_1$ . . . KRCpub$_N$. These N levels of encryption dictate that all of the KRCs need to play a part in accessing the US. More specifically, N levels of decryption are required through sequential interaction with KRC$_N$, KRC$_{N-1}$, . . . and KRC$_1$, which store the corresponding private keys, KRCpriv$_N$, KRCpriv$_{N-1}$, . . . , and KRCpriv$_1$, respectively.

In the recovery process, a potential decryptor begins by sending the KRF to KRC$_N$. After the challenge based on the access rule referenced by ARI$_N$ is satisfied, KRC$_N$ returns the data represented by [... [[US]KRCpub$_1$]KRCpub$_2$] . . . ]KRCpub$_{N-1}$. This process continues until KRC$_1$ returns the actual US.

In Quorum-Access, a plurality of KRFs are generated. In a similar manner to OR-Access, each $KRF_1$ is generated using a KRCpub$_i$ that is associated with a separate KRC$_1$. In this case, however, each public key, KRCpub$_1$ . . . KRCpub$_N$, is used to control access to a part of the US. Generally, the US is divided in N pieces, US$_1$, US$_2$, . . . , and US$_N$, such that any k pieces are sufficient to reconstruct US but complete knowledge of any k-1 pieces reveals no information about US. An example of such a k-out-of-N secret-sharing mechanism is described in A. Shamir, "How to Share a Secret", in the Communications of the ACK vol. 22, no. 11, pp. 612–613, November 1979, herein incorporated by reference. If k=N, all N pieces of the US are required. Examples of these scenarios are where US=US$_1$⊕US$_2$⊕. . .⊕US$_N$, or US=US$_1$, ||US$_2$||. . . ||US$_N$.

The plurality of KRFs can be expressed as:

$$KRF_1 = [US_1]KRCpub_1$$
$$KRF_2 = [US_2]KRCpub_2$$
$$\vdots$$
$$KRF_N = [US_N]KRCpub_N$$

Note again that the abbreviated expressions for $KRF_1 \ldots KRF_N$ do not include the ARI and other fields illustrated in the embodiments of FIGS. 10 and 15. Generally, the abbreviated expressions for $KRF_1 \ldots KRF_N$ can be based on either KRF embodiment.

As noted, each of the KRFs is generated using a separate KRCpub$_i$ that is associated with one of a plurality of KRCs. Thus, each separate KRCpub$_i$ has a corresponding KRCpriv$_i$ that is stored in a different KRC.

In the recovery process, a potential decryptor sends each KRF$_i$ to the corresponding KRC$_i$. After the challenge based on the access rule referenced by ARI$_i$ is satisfied, KRC$_i$ returns the piece of data US$_i$. This process continues until at least k pieces of US are obtained. At this point, the US can be reconstructed.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for an encrypting system to control access to a user secret, the access being defined by one or more access rules, the method comprising the steps of:
   (1) receiving an access rule index from an access rule index source, said access rule index referencing one or more access rules to control access to a user secret; and
   (2) generating a key recovery field that includes an unencrypted header section and an encrypted payload section, wherein said unencrypted header section includes at least said access rule index and said encrypted payload section includes at least said user secret.

2. The method of claim 1, wherein step (2) comprises the step of generating a key recovery field that includes an unencrypted header section and an encrypted payload section, wherein said unencrypted header section includes said access rule index and an access rule index binding digest, said access rule index binding digest securely binding said access rule index to said encrypted payload section.

3. The method of claim 2, wherein step (2) comprises the step of generating a key recovery field that includes an unencrypted header section and an encrypted payload section, wherein said unencrypted header section includes said access rule index and an access rule index binding digest, said access rule index binding digest including a hash of information that includes at least a portion of said access rule index and at least a portion of said encrypted payload.

4. The method of claim 2, wherein step (2) comprises the step of generating a key recovery field that includes an unencrypted header section and an encrypted payload section, wherein said unencrypted header section includes said access rule index, a key identifier, and an access rule index binding digest, said access rule index binding digest securely binding said access rule index to said user secret in said encrypted payload section.

5. The method of claim 4, wherein step (2) comprises the step of generating a key recovery field that includes an unencrypted header section and an encrypted payload section, wherein said unencrypted header section includes said access rule index, a key identifier, and an access rule index binding digest, said access rule index binding digest including a hash of information that includes at least a portion of said access rule index, at least a portion of said key identifier, and at least a portion of said encrypted payload.

6. The method of claim 4, wherein step (2) comprises the step of generating a key recovery field that includes an unencrypted header section and an encrypted payload section, wherein said unencrypted header section includes said access rule index, a key identifier, a key recovery center identifier, and an access rule index binding digest, said access rule index binding digest securely binding said access rule index to said user secret in said encrypted payload section.

7. The method of claim 6, wherein step (2) comprises the step of generating a key recovery field that includes an unencrypted header section and an encrypted payload section, wherein said unencrypted header section includes said access rule index, a key identifier, a key recovery center identifier, and an access rule index binding digest, said access rule index binding digest including a hash of information that includes at least a portion of said access rule index, at least a portion of said key identifier, at least a portion of said key recovery center identifier, and at least a portion of said encrypted payload.

8. The method of claim 7, wherein step (2) comprises the step of generating a key recovery field that includes an unencrypted header section and an encrypted payload section, wherein said unencrypted header section includes said access rule index, a key identifier, a key recovery center identifier, and an access rule index binding digest, said access rule index binding digest of the form:

H1 XOR H2
H1=HMAC [Key=Ka1] (HINFO‖encrypted payload)
H2=HMAC [Key=Ka2] (HINFO‖encrypted payload)
wherein HINFO includes at least a portion of said access rule index, at least a portion of said key identifier, and at least a portion of said key recovery center identifier.

9. The method of claim 8, wherein step (2) comprises the step of generating a key recovery field that includes an unencrypted header section and an encrypted payload section, wherein said encrypted payload section includes said user secret and a verification digest, said verification digest securely binding said key recovery center identifier and said key identifier with said encrypted payload section.

10. The method of claim 1, wherein step (2) comprises the step of generating a key recovery field that includes an unencrypted header section and an encrypted payload section, wherein said unencrypted header section includes an unprotected access rule index.

11. A system that enables an encrypting system to control access to a user secret, the access being defined by one or more access rules, the system comprising:
means for receiving an access rule index from an access rule index source, said access rule index referencing one or more access rules to control access to a user secret; and
means for generating a key recovery field that includes an unencrypted header section and an encrypted payload section, wherein said unencrypted header section includes at least said access rule index and said encrypted payload section includes at least said user secret.

12. The system of claim 11, wherein said unencrypted header section further includes an access rule index binding digest, said access rule index binding digest securely binding said access rule index to said encrypted payload section.

13. The system of claim 12, wherein said access rule index binding digest includes a hash of information that includes at least a portion of said access rule index and at least a portion of said encrypted payload.

14. The system of claim 12, wherein said unencrypted header section includes said access rule index, a key identifier, and an access rule index binding digest, said access rule index binding digest securely binding said access rule index to said user secret in said encrypted payload section.

15. The system of claim 14, wherein said access rule index binding digest includes a hash of information that includes at least a portion of said access rule index, at least a portion of said key identifier, and at least a portion of said encrypted payload.

16. The system of claim 14, wherein said unencrypted header section includes said access rule index, a key identifier, a key recovery center identifier, and an access rule index binding digest.

17. The system of claim 16, wherein said access rule index binding digest includes a hash of information that includes at least a portion of said access rule index, at least a portion of said key identifier, at least a portion of said key recovery center identifier, and at least a portion of said encrypted payload.

18. The system of claim 17, wherein said access rule index binding digest is of the form:

H1 XOR H2
H1=HMAC [Key=Ka1] (HINFO‖encrypted payload)
H2=HMAC [Key=Ka2] (HINFO‖encrypted payload)
wherein HINFO includes at least a portion of said access rule index, at least a portion of said key identifier, and at least a portion of said key recovery center identifier.

19. The system of claim 18, wherein said encrypted payload section includes said user secret and a verification digest, said verification digest securely binding said key recovery center identifier and said key identifier with said encrypted payload section.

20. The system of claim 11, wherein said unencrypted header section includes an unprotected access rule index.

21. A computer program product for enabling a processor in a computer system to control access to a user secret, the access being defined by one or more access rules, said computer program product comprising:
- a computer usable medium having computer readable program code means embodied in said medium for causing a program to execute on the computer system, said computer readable program code means comprising:
- a first computer readable program code means for enabling the computer system to receive an access rule index from an access rule index source, said access rule index referencing one or more access rules to control access to a user secret; and
- a first computer readable program code means for enabling the computer system to generate a key recovery field that includes an unencrypted header section and an encrypted payload section, wherein said unencrypted header section includes at least said access rule index and said encrypted payload section includes at least said user secret.

22. The computer program product of claim 21, wherein said unencrypted header section further includes an access rule index binding digest, said access rule index binding digest securely binding said access rule index to said encrypted payload section.

23. The computer program product of claim 22, wherein said access rule index binding digest includes a hash of information that includes at least a portion of said access rule index and at least a portion of said encrypted payload.

24. The computer program product of claim 22, wherein said unencrypted header section includes said access rule index, a key identifier, and an access rule index binding digest, said access rule index binding digest securely binding said access rule index to said user secret in said encrypted payload section.

25. The computer program product of claim 24, wherein said access rule index binding digest includes a hash of information that includes at least a portion of said access rule index, at least a portion of said key identifier, and at least a portion of said encrypted payload.

26. The computer program product of claim 24, wherein said unencrypted header section includes said access rule index, a key identifier, a key recovery center identifier, and an access rule index binding digest.

27. The computer program product of claim 26, wherein said access rule index binding digest includes a hash of information that includes at least a portion of said access rule index, at least a portion of said key identifier, at least a portion of said key recovery center identifier, and a t least a portion of said encrypted payload.

28. The computer program product of claim 27, wherein said access rule index binding digest is of the form:

H1 XOR H2

H1=HMAC [Key=Ka1] (HINFO∥encrypted payload)

H2=HMAC [Key=Ka2] (HINFO∥encrypted payload)

wherein HINFO includes at least a portion of said access rule index, at least a portion of said key identifier, and at least a portion of said key recovery center identifier.

29. The computer program product of claim 28, wherein said encrypted payload section includes said user secret and a verification digest, said verification digest securely binding said key recovery center identifier and said key identifier with said encrypted payload section.

30. The computer program product of claim 21, wherein said unencrypted header section includes an unprotected access rule index.

* * * * *